(12) United States Patent
Tanaka et al.

(10) Patent No.: US 11,343,019 B2
(45) Date of Patent: May 24, 2022

(54) COMMUNICATION APPARATUS AND METHOD

(71) Applicant: SONY CORPORATION, Tokyo (JP)

(72) Inventors: Yusuke Tanaka, Tokyo (JP); Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 142 days.

(21) Appl. No.: 16/640,548

(22) PCT Filed: Aug. 17, 2018

(86) PCT No.: PCT/JP2018/030488
§ 371 (c)(1),
(2) Date: Feb. 20, 2020

(87) PCT Pub. No.: WO2019/044535
PCT Pub. Date: Mar. 7, 2019

(65) Prior Publication Data
US 2020/0252163 A1      Aug. 6, 2020

(30) Foreign Application Priority Data
Aug. 31, 2017      (JP) .............................. JP2017-166870

(51) Int. Cl.
*H04L 1/08*      (2006.01)
*H04L 1/18*      (2006.01)
(Continued)

(52) U.S. Cl.
CPC .............. *H04L 1/08* (2013.01); *H04L 1/1896* (2013.01); *H04W 84/12* (2013.01); *H04L 1/1664* (2013.01)

(58) Field of Classification Search
CPC ..... H04W 80/04; H04W 88/06; H04W 88/08; H04W 84/18; H04W 84/12; H04L 29/06; H04L 1/1896; H04L 1/08; H04L 1/1664
(Continued)

(56) References Cited

U.S. PATENT DOCUMENTS 6,330,435 B1      12/2001   Lazraq et al.
6,621,796 B1 *     9/2003   Miklos .................. H04L 1/1621
                                                              370/236
(Continued)

FOREIGN PATENT DOCUMENTS

CA           2355005 A1      2/2002
CN           1440153 A       9/2003
(Continued)

OTHER PUBLICATIONS

Qiao, et al., "BlockAck Bitmap", IEEE 802.11-16/0404r0, Mar. 12, 2016, 25 pages.

(Continued)

*Primary Examiner* — Peter G Solinsky
*Assistant Examiner* — Sanjay K Dewan
(74) *Attorney, Agent, or Firm* — Chip Law Group

(57) ABSTRACT

Provided is a communication apparatus and a method that allow for synthesis of information using an original signal and a retransmission signal for retransmitting information of the original signal whose demodulation has failed, in wireless communication with independent physical layer and MAC layer. Information is transmitted regarding a configuration of a retransmission signal for retransmitting information of an original signal whose demodulation has failed to a sender of the retransmission signal, and the retransmission signal transmitted from the sender is received on the basis of the information regarding the configuration of the retransmission signal transmitted. The present disclosure is appli- (Continued)

cable, for example, to a transmission/reception apparatus, a communication apparatus, an information processing apparatus, electronic equipment, a computer, a storage medium, and a system, and so on.

18 Claims, 13 Drawing Sheets

(51) Int. Cl.
  *H04W 84/12* (2009.01)
  *H04L 1/16* (2006.01)
(58) Field of Classification Search
  USPC .......................................................... 370/328
  See application file for complete search history.

(56) References Cited

U.S. PATENT DOCUMENTS

| | | | |
|---|---|---|---|
| 8,422,474 B2* | 4/2013 | Park | H04L 1/08 |
| | | | 370/338 |
| 10,735,136 B2* | 8/2020 | Yoshimoto | H04W 72/0466 |
| 2002/0038441 A1* | 3/2002 | Eguchi | H04L 1/1883 |
| | | | 714/748 |
| 2003/0167433 A1 | 9/2003 | Wengerter et al. | |
| 2010/0325507 A1* | 12/2010 | Sung | H04L 1/1812 |
| | | | 714/749 |
| 2011/0021157 A1* | 1/2011 | Sahara | H04L 1/1825 |
| | | | 455/67.13 |
| 2014/0293868 A1* | 10/2014 | Levanen | H04L 1/1607 |
| | | | 370/328 |
| 2015/0236822 A1* | 8/2015 | Pirskanen | H04W 72/044 |
| | | | 370/329 |
| 2017/0126363 A1* | 5/2017 | Wang | H04L 1/1671 |
| 2017/0201905 A1* | 7/2017 | Trainin | H04L 1/1614 |
| 2017/0230149 A1* | 8/2017 | Wang | H04L 1/1819 |
| 2020/0119859 A1 | 4/2020 | Wang et al. | |
| 2020/0136758 A1 | 4/2020 | Wang et al. | |
| 2020/0153558 A1* | 5/2020 | Sugaya | H04L 1/1819 |

FOREIGN PATENT DOCUMENTS

| | | | | |
|---|---|---|---|---|
| CN | 101946445 A | | 1/2011 | |
| CN | 106464434 A | | 2/2017 | |
| EP | 1337066 A1 | | 8/2003 | |
| EP | 1720279 A1 | | 11/2006 | |
| EP | 3120476 A1 | | 1/2017 | |
| GB | 2510139 A | | 7/2014 | |
| JP | 2002-124992 A | | 4/2002 | |
| JP | 2002124992 A | * | 4/2002 | ............. H04L 12/56 |
| JP | 2002-539713 A | | 11/2002 | |
| JP | 2003264535 A | * | 2/2003 | ............... H04L 1/20 |
| JP | 2003-264535 A | | 9/2003 | |
| JP | 2004-253959 A | | 9/2004 | |
| JP | 5254369 B2 | | 8/2013 | |
| JP | 2017-079339 A | | 4/2017 | |
| JP | 2017079339 A | * | 4/2017 | ............ H04W 28/04 |
| JP | WO 2019/021588 A1 | * | 1/2019 | ........... H04L 1/0047 |
| KR | 10-2010-0087035 A | | 8/2010 | |
| TW | 201519596 A | | 5/2015 | |
| WO | 2000/056002 A1 | | 9/2000 | |
| WO | 2000/057594 A1 | | 9/2000 | |
| WO | 2009/151278 A2 | | 12/2009 | |
| WO | 2015/006640 A1 | | 1/2015 | |
| WO | 2015/133646 A1 | | 9/2015 | |
| WO | 2015/142932 A1 | | 9/2015 | |
| WO | 2019/021588 A1 | | 1/2019 | |

OTHER PUBLICATIONS

Office Action for AU Patent Application No. 2018326862, dated May 21, 2021, 5 pages of Office Action.

Qiao, et al., "BlockAck Bitmap", IEEE 802.11-16/0404r0, Mar. 12, 2016, 24 pages.

International Search Report and Written Opinion of PCT Application No. PCT/JP2018/030488, dated Oct. 30, 2018, 12 pages of ISRWO.

Extended European Search Report of EP Application No. 18851426.9, dated Aug. 6, 2020, 09 pages.

* cited by examiner

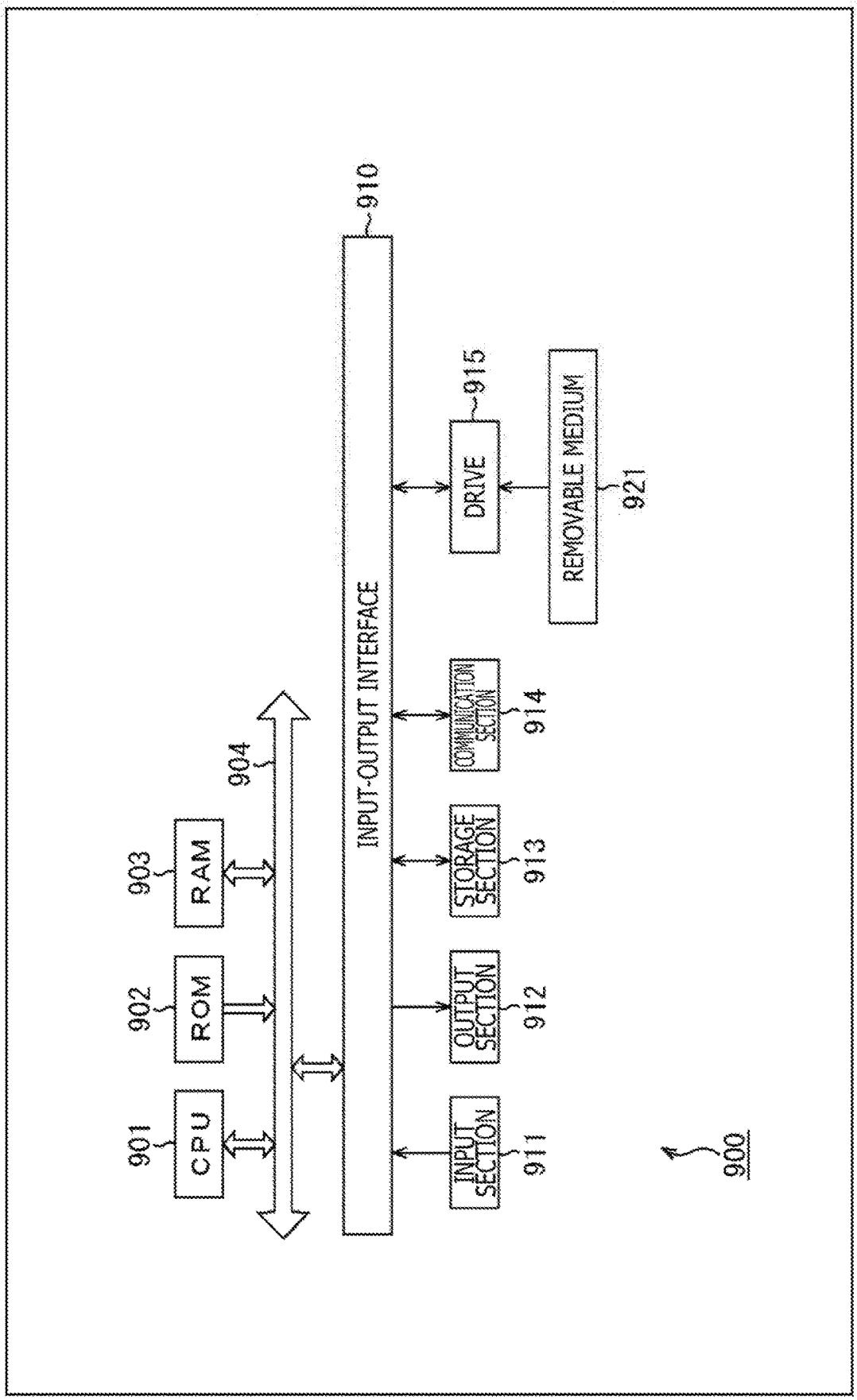

COMMUNICATION APPARATUS AND METHOD

CROSS REFERENCE TO RELATED APPLICATIONS

This application is a U.S. National Phase of International Patent Application No. PCT/JP2018/030488 filed on Aug. 17, 2018, which claims priority benefit of Japanese Patent Application No. JP 2017-166870 filed in the Japan Patent Office on Aug. 31, 2017. Each of the above-referenced applications is hereby incorporated herein by reference in its entirety.

TECHNICAL FIELD

The present technology relates to a communication apparatus and a method and relates particularly to a communication apparatus and a method that allow for synthesis of information using an original signal and a retransmission signal for retransmitting information of the original signal whose demodulation has failed, in wireless communication with independent physical layer and MAC layer.

BACKGROUND ART

A technique called HARQ (Hybrid Automatic Repeat-request) has been available so far that provides, in wireless communication, a gain over normal retransmission by properly synthesizing information regarding a signal whose demodulation has failed and information regarding a signal received by retransmission.

Incidentally, in a wireless LAN (Local Area Network), a physical layer and a transport layer are independent of each other. The physical layer handles modulation and demodulation processes and coding and decoding processes on received signals. The transport layer includes a MAC layer that identifies details and an order of signals. Because of a variable frame length, in the case where block coding is used, a coding unit thereof is independent of the frame length in the MAC layer. This has made it difficult to apply HARQ.

For this reason, a method was conceived that permits identification of signals to be synthesized and application of HARQ to the wireless LAN by adding an HARQ header including an identifier and a length of a frame to a physical layer header (refer, for example, to PTL 1).

CITATION LIST

Patent Literature

[PTL 1]
Japanese Patent No. 5254369

SUMMARY

Technical Problem

However, in the case of the method described in this PTL 1, a significant increase in overhead or an increase in buffer usage may occur, thus making it difficult to realize the application of HARQ.

The present disclosure has been devised in light of the foregoing, and it is an object of the present disclosure to allow for synthesis of information using an original signal and a retransmission signal for retransmitting information of the original signal whose demodulation has failed, in wireless communication with independent physical layer and MAC layer.

Solution to Problem

A communication apparatus of an aspect of the present technology is a communication apparatus that includes a communication section adapted to transmit information regarding a configuration of a retransmission signal for retransmitting information of an original signal whose demodulation has failed to a sender of the retransmission signal and receive the retransmission signal transmitted from the sender on the basis of the information regarding the configuration of the retransmission signal transmitted.

A communication method of an aspect of the present technology is a communication method including, by a communication apparatus, transmitting information regarding a configuration of a retransmission signal for retransmitting information of an original signal whose demodulation has failed to a sender of the retransmission signal, and receiving the retransmission signal transmitted from the sender on the basis of the information regarding the configuration of the retransmission signal transmitted.

A communication apparatus of another aspect of the present technology is a communication apparatus that includes a communication section adapted to receive information regarding a configuration of a retransmission signal for retransmitting information of an original signal whose demodulation has failed, generate the retransmission signal on the basis of the information regarding the configuration of the retransmission signal received, and transmit the generated retransmission signal to a sender of the information regarding the configuration of the retransmission signal.

A communication method of another aspect of the present technology is a communication method including, by a communication apparatus, receiving information regarding a configuration of a retransmission signal for retransmitting information of an original signal whose demodulation has failed, generating the retransmission signal on the basis of the information regarding the configuration of the retransmission signal received, and transmitting the generated retransmission signal to a sender of the information regarding the configuration of the retransmission signal.

In the communication apparatus and the method of an aspect of the present technology, information regarding a configuration of a retransmission signal for retransmitting information of an original signal whose demodulation has failed is transmitted to a sender of the retransmission signal, and the retransmission signal transmitted from the sender is received on the basis of the information regarding the configuration of the retransmission signal transmitted.

In the communication apparatus and the method of another aspect of the present technology, information regarding a configuration of a retransmission signal for retransmitting information of an original signal whose demodulation has failed is received, the retransmission signal is generated on the basis of the information regarding the configuration of the retransmission signal received, and the generated retransmission signal is transmitted to a sender of the information regarding the configuration of the retransmission signal.

Advantageous Effects of Invention

The present technology allows for communication. Also, the present technology allows for synthesis of information using an original signal and a retransmission signal for retransmitting information of an original signal whose demodulation has failed, in wireless communication with independent physical layer and MAC layer.

BRIEF DESCRIPTION OF DRAWINGS

FIG. 13 is a block diagram illustrating a main configuration example of a computer.

DESCRIPTION OF EMBODIMENT

Figure 1:
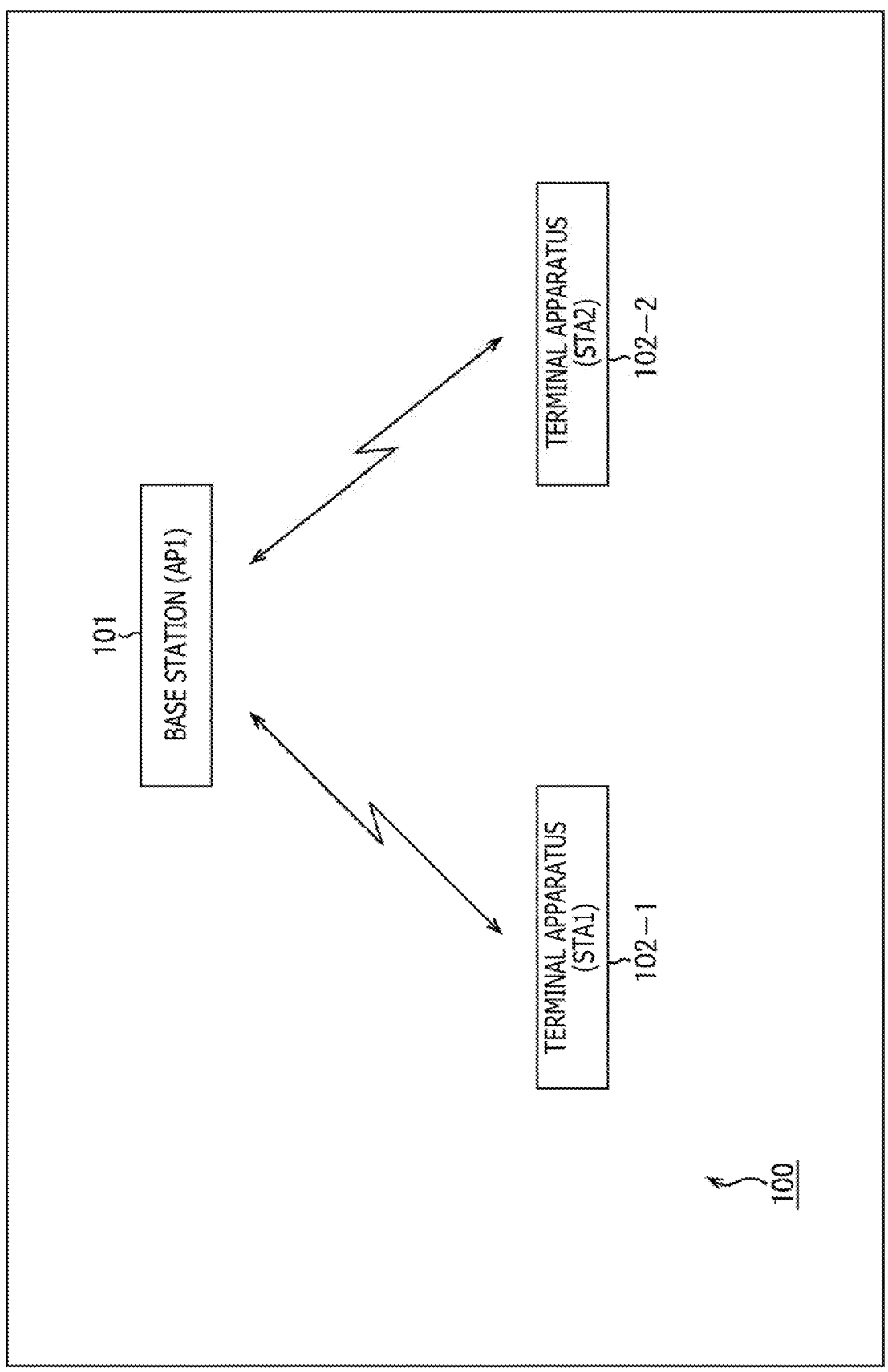
FIG. 1 is a diagram illustrating a main configuration example of a communication system.

A description will be given below of a mode for carrying out the present disclosure (hereinafter referred to as an embodiment). It should be noted that the description will be given in the following order.

1. First embodiment (communication system)
2. Others

1. First Embodiment

<HARQ>

Recent years have witnessed a number of terminals engaging in communication in the same space and at the same frequency thanks to widespread use of wireless terminals. In such a dense environment, an SINR (Signal to Interference plus Noise power Ratio) changes dynamically on the receiving side due to collision between transmission signals or other causes, resulting in an increasing number of signals that cannot be demodulated properly. In the case where a signal cannot be demodulated properly, it is common to request retransmission of the signal and perform reception once again, thus ensuring communication quality. However, if retransmission is repeated a number of times, the retransmission itself consumes communication resources, possibly deteriorating the system's communication quality as a whole.

For this reason, a technique called HARQ (Hybrid Automatic Repeat-request) was conceived to realize efficient retransmission. HARQ is a technique that synthesizes information using an original signal and a retransmission signal for retransmitting information of the original signal whose demodulation has failed. Proper synthesis of information of the original signal and information of the retransmission signal by using this HARQ presumably contributes to reduced resource consumption attributable to retransmission as compared to normal retransmission (ARQ (Automatic Repeat-request)), thus ensuring the system's communication quality as a whole.

Incidentally, for example, in the case of a wireless LAN (Local Area Network), a physical layer and a transport layer are independent of each other. The physical layer handles modulation and demodulation processes and coding and decoding processes on received signals. The transport layer includes a Media Access Control (MAC) layer that identifies details and an order of signals. Also, because of a variable frame length, in the case where block coding is used, a coding unit thereof is independent of the frame length in the MAC layer. In other words, in the case where an error occurs in a certain frame in the MAC layer, one cannot tell in which coding block the error has occurred, making it difficult to distinguish correctly received bit strings and use those strings for synthesis. Also, if a signal is at an intermediate stage of processing between its reception and its conversion into bit strings, it is impossible to identify which frame's information is included in the signal, thus making it difficult to synthesize the original signal and the retransmission signal in a linked way at the intermediate stage of processing. For this reason, it has been difficult to simply apply HARQ to the wireless LAN communication.

In PTL 1, the identification of signals to be synthesized and the application of HARQ to the wireless LAN are made possible by adding an HARQ header including an identifier and a length of a frame to a physical layer header.

In a normal case, however, a physical layer header includes important information in terms of communication. Therefore, highly reliable modulation is used. For this reason, storing information regarding a large number of frame identifiers and lengths in a physical layer header has entailed a potential risk of a significant increase in overhead. Also, the communication apparatus on the receiving side cannot tell when HARQ-based retransmission takes place, making it necessary for the communication apparatus on the receiving side to be on standby constantly for reception operation compliant with HARQ and, therefore, have a number of buffers to continuously retain the signal. Also, in the case where the communication apparatus on the transmitting side discards a frame, the communication apparatus on the receiving side cannot detect the discard. As a result, the communication apparatus on the receiving side unnecessarily retains the signal in the buffer, possibly resulting in wasteful buffer consumption. For this reason, it has been difficult to realize HARQ in the wireless LAN by using this method.

<Transmitting HARQinfo>

As such, HARQ is realized in the wireless LAN without requiring any additional information in the physical layer header. More specifically, for example, the communication apparatus on the receiving side of HARQ-based retransmission explicitly notifies the transmitting side of a data transmission request together with HARQ information such as an identifier, an order, and a length, of data, and the communication apparatus on the transmitting side identifies data to be transmitted on the basis of HARQ information, decides the order and modulation and coding schemes, and transmits a normal signal that does not include any additional information, in response to the request.

The communication apparatus on the receiving side already retains the identifier, the order, the length, and so on, of the data, included in the signal. Therefore, doing so allows to identify in which coding block an error has occurred in the MAC layer, thus making it possible to distinguish bit strings that have been properly received and use such bit strings for synthesis. Also, it becomes possible to synthesize an original signal and a retransmission signal in a linked way at an intermediate stage of processing between reception and conversion into bit strings.

<Communication System>

FIG. 1 is a block diagram illustrating a main configuration example of an embodiment of a communication system to which the present technology is applied. A communication system 100 illustrated in FIG. 1 is a system that forms what is generally called a wireless LAN and has a base station 101 (AP1), a terminal apparatus 102-1 (STA1), and a terminal apparatus 102-2 (STA2).

The base station 101 (AP1) is a communication apparatus that is also referred to as an access point and functions as what is generally called a parent unit and wirelessly communicates with the terminal apparatus 102-1 (STA1) and the terminal apparatus 102-2 (STA2), which are what are generally called child units. This wireless communication may be carried out through any scheme as long as the physical layer and the MAC layer are independent of each other. For example, a wireless communication scheme standardized in IEEE (Institute of Electrical and Electronic Engineers) 802.11 may be used.

In the description given below, in the case where there is no need to distinguish between the terminal apparatus 102-1 and the terminal apparatus 102-2 for description, these apparatuses will be referred to as terminal apparatuses 102. It should be noted that the configuration illustrated in FIG. 1 is merely an example and that the configuration of the communication system 100 is arbitrary and not limited to this example. For example, the number of base stations 101 and that of terminal apparatuses 102 are arbitrary, respectively, and not limited to the example illustrated in FIG. 1. Also, a connection relationship between the apparatuses is also arbitrary.

HARQ is applied to the communication system 100 configured as described above. In other words, in the case where demodulation of a received signal (also referred to as an original signal) fails, the base station 101 and the terminal apparatus 102 synthesize information by using HARQ. In other words, the base station 101 and the terminal apparatus 102 cause information lost as a result of failure of the demodulation of the original signal thereof to be retransmitted as a retransmission signal and properly synthesize information of the original signal (also referred to as original information) and information of the retransmission signal (also referred to as retransmission information) by using the original signal and the retransmission signal.

At this time, the base station 101 and the terminal apparatus 102 on the signal retransmission requesting side carry out HARQ to which the present technology is applied. In other words, the base station 101 and the terminal apparatus 102 transmit, in addition to a retransmission request, information regarding the configuration of the retransmission signal to a sender of the retransmission signal, thus causing the sender to transmit the retransmission signal based on the information regarding the configuration of the retransmission signal.

<Communication Apparatus>

Figure 2:
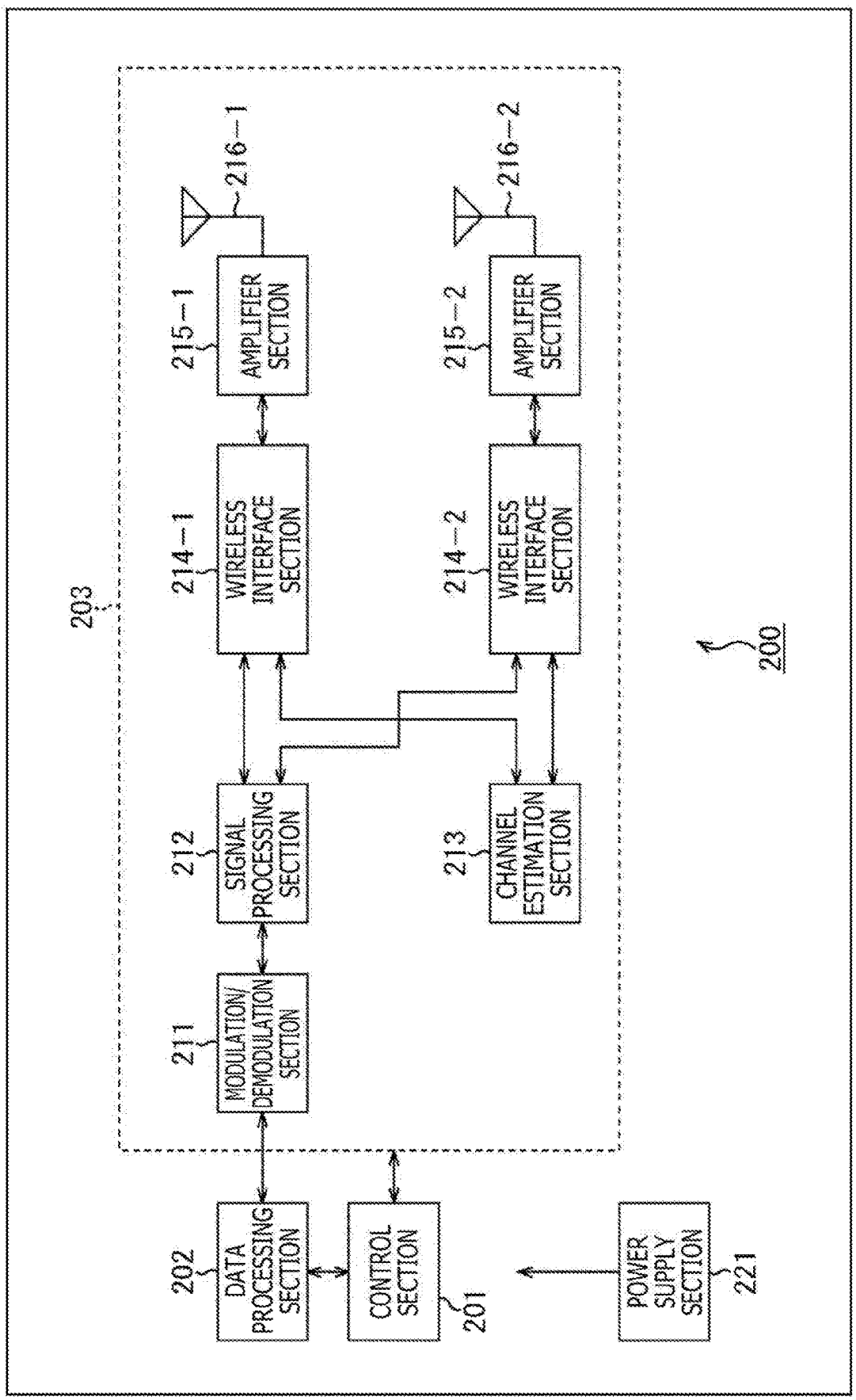
FIG. 2 is a diagram illustrating a main configuration example of a communication apparatus.

FIG. 2 is a block diagram illustrating a main configuration example of an embodiment of a communication apparatus to which the present technology is applied. The base station 101 and the terminal apparatus 102 illustrated in FIG. 1 have a configuration similar to that of a communication apparatus 200 illustrated in FIG. 2 as a configuration related to wireless communication. In other words, the communication apparatus 200 can be used as the base station 101 and the terminal apparatus 102 in the communication system 100 illustrated in FIG. 100. In the description given below, the communication apparatus 200 illustrated in FIG. 2 will be used to describe the main configurations of the base station 101 and the terminal apparatus 102 illustrated in FIG. 1.

The communication apparatus 200 illustrated in FIG. 2 wirelessly communicates with another communication apparatus through a wireless communication scheme standardized in IEEE802.11. Also, the communication apparatus 200 has an HARQ function, thus making the communication apparatus 200 capable of handling retransmission of information through HARQ on its own, causing a communication counterpart to handle retransmission, or handling both tasks.

Also, in the case where it is possible to cause the communication counterpart to retransmit information through HARQ, the communication apparatus 200 can carry out, through the HARQ, information synthesis by using the original signal and the retransmission signal thereof (i.e., properly synthesize original information and retransmission information). This synthesis of information through the HARQ (synthesis of information by using the original signal and the retransmission signal) may be carried out as data acquired by the demodulation of a signal or at an intermediate stage of processing before conversion into data (bit strings) (e.g., as an I signal and a Q signal).

In other words, the communication apparatus 200 may either properly synthesize original data acquired by the demodulation of the original signal and retransmission data acquired by the demodulation of the retransmission signal or properly synthesize the original signal and the retransmission signal at an intermediate stage of processing. Needless to say, the communication apparatus 200 may be capable of performing both tasks (capable of synthesizing in either way).

It should be noted that which specific method to be used for information synthesis through this HARQ is arbitrary. For example, a lost portion of the original information may be replaced with the retransmission information. Alternatively, for example, the original signal may be used for demodulation of the retransmission signal.

As illustrated in FIG. 2, the communication apparatus 200 includes a control section 201, a data processing section 202, and a wireless communication section 203. The wireless communication section 203 includes a modulation/demodulation section 211, a signal processing section 212, a channel estimation section 213, a wireless interface section 214-1, an amplifier section 215-1, an antenna 216-1, a wireless interface section 214-2, an amplifier section 215-2, and an antenna 216-2. Further, the communication apparatus 200 includes a power supply section 221.

It should be noted that in the case where there is no need to distinguish between the wireless interface section 214-1 and the wireless interface section 214-2 for description, these components will be referred to as wireless interface sections 214. Also, in the case where there is no need to distinguish between the amplifier section 215-1 and the amplifier section 215-2 for description, these components will be referred to as amplifier sections 215. Further, in the case where there is no need to distinguish between the antenna 216-1 and the antenna 216-2 for description, these components will be referred to as antennas 216.

Although two wireless interface sections 214, two amplifier sections 215, and two antennas 216 each are depicted in FIG. 2, these numbers are arbitrary, and there may be only one each of these components. Alternatively, there may be three or more each of these components.

Also, the wireless interface section 214, the amplifier section 215, and the antenna 216 may be combined into a single component (may be configured as a single processing section). Also, the wireless interface section 214 may have the function of the amplifier section 215 so that the amplifier section 215 is omitted.

In the case where data input from an upper layer is transmitted, the data processing section 202 generates a packet for wireless transmission from the data and performs processes such as addition of a header for media access control (MAC (Media Access Control)) and addition of an error detection code. The data processing section 202 provides the processed data to the modulation/demodulation section 211.

In the case where received data is supplied from the modulation/demodulation section 211, the data processing section 202 analyzes the MAC header, detects packet errors, performs a reorder process, and handles other tasks. Also, the data processing section 202 synthesizes information on the basis of HARQ information. For example, the data processing section 202 properly synthesizes the original data acquired by the demodulation of the original signal and the retransmission data acquired by the demodulation of the retransmission signal. The data processing section 202 provides the processed data to its upper protocol layer.

The control section 201 handles passing of information between different sections. Also, the control section 201 sets parameters for the modulation/demodulation section 211 and the signal processing section 212, schedules packets in the data processing section 202, and handles other tasks. Further, the control section 201 sets parameters for each of the wireless interface sections 214 and each of the amplifier sections 215, controls transmission power, and handles other tasks.

Also, the control section 201 performs processes such as retaining capability information of the communication apparatus 200, finding out about capability information of the communication counterpart, retaining a negotiation result on MPDU size information, making determination as to whether or not to negotiate the size, making determination as to whether or not to request retransmission, generating HARQ information, making determination as to whether or not a retransmission request has been received, generating retransmission information, retaining information required for retransmission of a signal using HARQ such as HARQ information, and generating retransmission information on the basis of HARQ information.

Further, the control section 201 controls the data processing section 202 and each of the processing sections (the modulation/demodulation section 211 to the antennas 216) of the wireless communication section 203, causing these sections to perform processes such as exchanging capability information, negotiating an MPDU size, transmitting and receiving an original signal, acquiring original data, detecting errors (making determination as to whether reception has succeeded or failed), retaining the original signal (original data), transmitting and receiving BA, transmitting and receiving a retransmission request signal including HARQ information, transmitting and receiving a retransmission signal, and synthesizing information by using an original signal and a retransmission signal through HARQ.

The wireless communication section 203 performs processes regarding wireless communication such as transmitting and receiving signals.

In the case of signal transmission, the modulation/demodulation section 211 performs encoding, interleaving, modulation, and other processes on the basis of coding and modulation schemes set by the control section 201 for data input from the data processing section 202, thus generating a data symbol stream. The modulation/demodulation section 211 supplies the data symbol stream to the signal processing section 212.

In the case of signal reception, the modulation/demodulation section 211 performs, on input from the signal processing section 212, processes opposite to processes at the time of signal transmission described above. For example, the modulation/demodulation section 211 performs demodulation, decoding, and other processes on the signal supplied from the signal processing section 212. Also, the modulation/demodulation section 211 synthesizes information on the basis of HARQ information. For example, the modulation/demodulation section 211 properly synthesizes an original signal and a retransmission signal at an intermediate stage of processing. The modulation/demodulation section 211 supplies data that has undergone these processes to the data processing section 202 or the control section 201.

In the case of signal transmission, the signal processing section 212 performs, on input from the modulation/demodulation section 211, signal processing used for space separation, as needed, thus generating one or more transmission symbol streams. The signal processing section 212 supplies the one or more transmission symbol streams acquired to the respective wireless interface sections 214.

In the case of signal reception, the signal processing section 212 performs signal processing on the reception symbol streams input from the respective wireless interface sections 214, thus performing space decomposition of the streams as necessary. The signal processing section 212 supplies the processed signal to the modulation/demodulation section 211.

The channel estimation section 213 calculates complex channel gain information of a propagation path on the basis of an input signal's preamble portion and training signal portion from each of the wireless interface sections 214. The channel estimation section 213 supplies the calculated complex channel gain information to the modulation/demodulation section 211 and the signal processing section 212 via the control section 201. The modulation/demodulation section 211 employs the complex channel gain information for the demodulation process. The signal processing section 212 employs the complex channel gain information for signal processing used for space separation.

In the case of signal transmission, the wireless interface section 214 converts input from the signal processing section 212 into an analog signal, filters the analog signal, and upconverts the signal to a carrier frequency, transmitting the processed signal to the amplifier section 215. Also, in the case of signal reception, the wireless interface section 214 performs, on input from the amplifier section 215, processes opposite to processes at the time of signal transmission, supplying the processed data to the signal processing section 212 and the channel estimation section 213.

In the case of signal transmission, the amplifier section 215 amplifies the analog signal input from the wireless interface section 214 to a given level of power, transmitting the analog signal as a wireless signal via the antenna 216 (emitting the signal into the air). Also, in the case of signal reception, the amplifier section 215 receives a wireless signal via the antenna 216 (a signal transmitted through the air) and amplifies the received signal to a given level of power, supplying the signal to the wireless interface section 214. It should be noted that at least one of the function of the amplifier section 215 in the case of signal transmission or the function of the amplifier section 215 in the case of signal reception may be included in the wireless interface section 214.

The power supply section 221 includes a battery power supply or a stationary power supply, supplying power to each processing section (the control section 201, the data processing section 202, and the wireless communication section 203 (the modulation/demodulation section 211 to the antenna 216)) of the communication apparatus 200. It should be noted that this supply of power may be controlled by the control section 201.

<Modulation/Demodulation Section 211>

Figure 3:
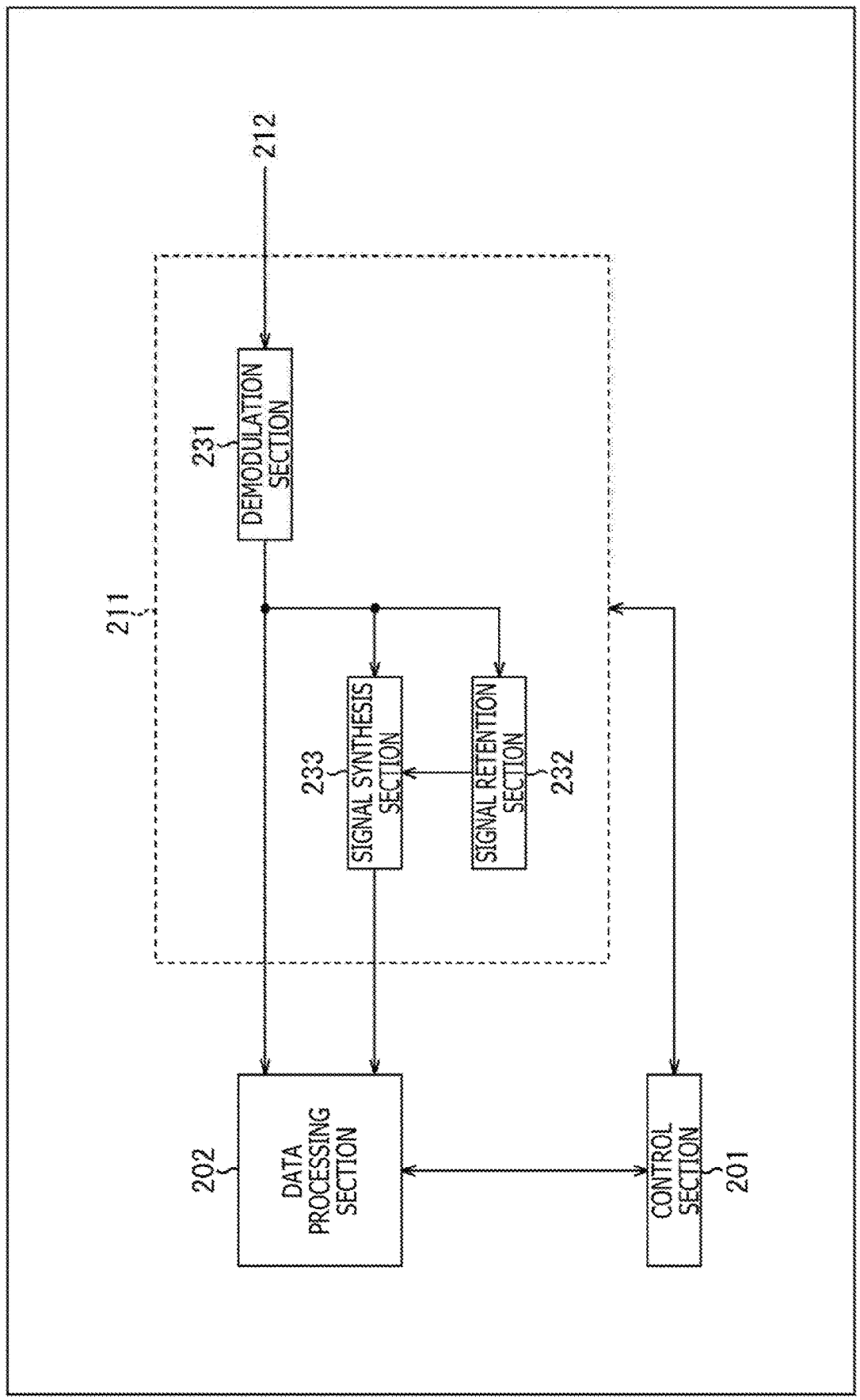
FIG. 3 is a diagram illustrating a main configuration example of a modulation/demodulation section.

FIG. 3 illustrates a main configuration example regarding processes performed by the modulation/demodulation section 211 at the time of signal reception in the case where an original signal and a retransmission signal are synthesized at an intermediate stage of processing as HARQ-based synthesis. In this case, the modulation/demodulation section 211 includes a demodulation section 231, a signal retention section 232, and a signal synthesis section 233 as components related to processes in the case of signal reception as illustrated in FIG. 3.

The demodulation section 231 demodulates the original signal input from the signal processing section 212 on the basis of the coding and modulation schemes set by the control section 201. The demodulation section 231 supplies the original data acquired by the demodulation to any one of the data processing section 202, the signal synthesis section 233, or the signal retention section 232 on the basis of the setting made by the control section 201.

For example, in the case of a signal not including HARQ-based retransmission data, the demodulation section 231 performs deinterleaving and other processes on the demodulated data, supplying the processed demodulated data to the data processing section 202. Also, the demodulation section 231 supplies the demodulated data to the signal retention section 232 for retention. The data processing section 202 determines whether the reception has succeeded or failed by using error detection and other techniques on the supplied demodulated data. In the case where the data has not been received properly, the data processing section 202 controls the signal retention section 232 to continuously retain the data.

Also, for example, in the case of a signal including HARQ-based retransmission data, the demodulation section 231 supplies the demodulated data to the signal retention section 232 for retention. Also, the demodulation section 231 supplies the demodulated data to the signal synthesis section 233.

The signal retention section 232 has an arbitrary storage medium such as a semiconductor memory and retains the supplied demodulated data in the storage medium. Also, the signal retention section 232 supplies the retained data to the signal synthesis section 233 in response to a request from the signal synthesis section 233 or other sections.

The signal synthesis section 233 reads out the demodulated data (retained data) retained in the signal retention section 232 for acquisition. Also, the signal synthesis section 233 synthesizes, by vector addition or other methods, pieces of demodulated data corresponding to the same data by using the retained data read out from the signal retention section 232 and the demodulated data (retransmission data) supplied from the demodulation section 231 in accordance with a data identifier, a data order, and data time included in HARQ information.

The signal synthesis section 233 performs deinterleaving and other processes on the synthesized demodulated data, supplying the processed demodulated data to the data processing section 202. The data processing section 202 determines whether the reception of the supplied demodulated data has succeeded or failed by using error detection or other methods and controls, in the case where the data was not properly received once again, the signal retention section 232 to retain the data.

It should be noted that in the case where the original data and the retransmission data are synthesized as HARQ-based synthesis, the data processing section 202 may retain the original data.

<Sequence>

Figure 4:
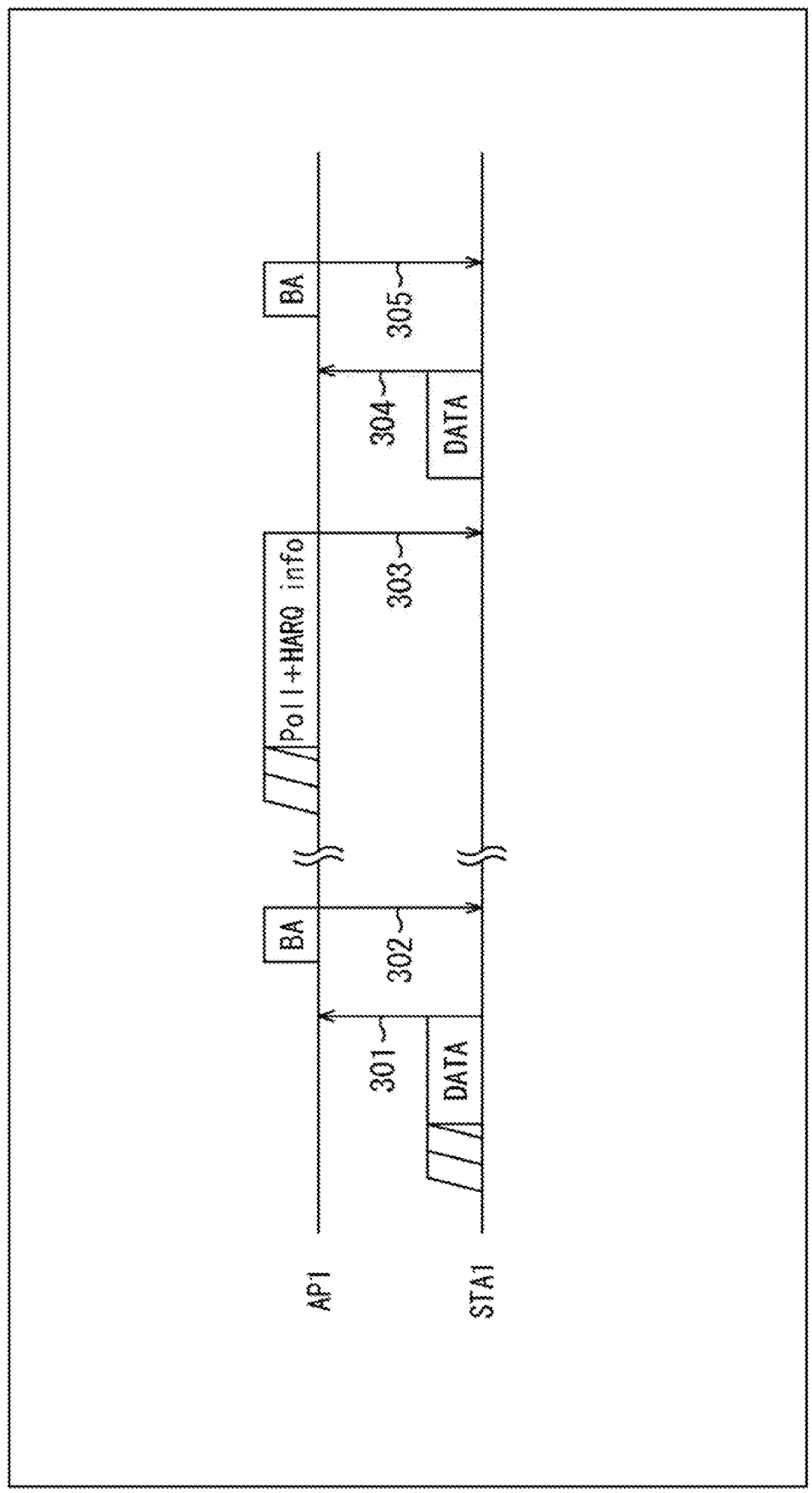
FIG. 4 is a diagram describing an example of a communication sequence.

A description will next be given of a communication flow in the case where the communication apparatus 200 as described above is applied to the base station 101 and the terminal apparatus 102 of the communication system 100 illustrated in FIG. 1. FIG. 4 is a diagram illustrating an example of a sequence in the case where single user communication takes place using a polling frame (hereinafter also referred to as a Poll frame) for all communication. FIG. 4 illustrates communication between the base station 101 (AP1) and the terminal apparatus 102-1 (STA1) as an example.

In FIG. 4, the horizontal axis represents a time axis, the white rectangles on each axis represent frames, and the parallelograms represent random waiting time provided by a collision avoidance mechanism. The solid line arrows extending from the frames indicate that the arrows point to the destinations of the frames.

Before this sequence begins, the base station 101 (AP1) and the terminal apparatus 102-1 (STA1), which is a subordinate unit of the base station 101, perform a confirmation sequence for capability on HARQ communication on the basis of HARQ information transmitted from the receiving side of the retransmission signal illustrated in the present working example. In other words, the base station 101 (AP1) and the terminal apparatus 102-1 (STA1), which is a subordinate unit of the base station 101, exchange their capability information regarding HARQ.

Also, before this sequence begins, the base station 101 (AP1) and the terminal apparatus 102-1 (STA1), which is a subordinate unit of the base station 101, may carry out a negotiation (size negotiation) to decide a data unit length such as an MPDU in the MAC layer. It should be noted that the data unit length may be an integer multiple of a coding block unit at the time of block coding.

The base station 101 (AP1) and the terminal apparatus 102-1 (STA1) communicate on the basis of a normal channel access procedure. In this example, the terminal apparatus 102-1 (STA1) acquires transmission right first and transmits a signal to the base station 101 (AP1) (an arrow 301).

The base station 101 (AP1) that received the signal acquires data such as an MPDU (Media Access Control Protocol Data Unit) by performing a reception process on the signal and then determines whether the data reception has succeeded or failed by performing error detection. Thereafter, the base station 101 (AP1) stores information based on whether the reception has succeeded or failed in a frame such as block ack (BA (Block Ack)), transmitting the frame to the terminal apparatus 102-1 (STA1) (an arrow 302).

Here, in the case where a signal whose demodulation has failed exists, the base station 101 (AP1) treats the signal as an original signal and retains, without discarding, at least part of the bit strings of the original data corresponding to that original signal or at least part of the original signal at an intermediate stage of processing. For example, the signal retention section 232 retains the original signal. This retained original signal will also be referred to as a retained signal. It should be noted that in the case where original data is retained, the original data will also be referred to as retained data.

Then, the base station 101 (AP1) transmits, to the terminal apparatus 102-1 (STA1), a Poll frame including HARQ information (HARQ info), as a retransmission request signal (retransmission request frame) requesting retransmission of a signal (an arrow 303).

HARQ information is information regarding the configuration of the retransmission signal and includes information required to engage in communication to which HARQ is applied (HARQ communication). HARQ information will be described in detail later. The terminal apparatus 102-1 (STA1) that received the Poll frame including HARQ information generates data (retransmission data) regarding requested information to be retransmitted (retransmission information) in accordance with the HARQ information and generates a signal including the retransmission data and new data (a signal including a retransmission signal), transmitting the signal to the base station 101 (AP1) (an arrow 304).

In the case where the data whose retransmission has been requested had already been discarded, the terminal apparatus 102-1 (STA1) may notify the requester that the data has already been discarded. For example, Null data may be transmitted as this notice.

The base station 101 (AP1) that received the signal performs a reception process on the signal in accordance with HARQ information notified by the base station 101 (AP1) itself, thus extracting the retransmission signal. The base station 101 (AP1) synthesizes information by using the original signal and the retransmission signal through HARQ, acquiring data such as an MPDU. For example, the base station 101 (AP1) synthesizes the retained signal (original signal) and the retransmission signal in the form of bit strings of data such as an MPDU or at an intermediate stage of processing before conversion into bit strings in accordance with HARQ information and demodulates the resultant data or performs other processes, thus acquiring data. Also, for example, the base station 101 (AP1) synthesizes the retransmission data, acquired, for example, by demodulating the retransmission signal, with the retained data (original data) in accordance with HARQ information.

The base station 101 (AP1) determines whether the data reception has succeeded or failed by performing error detection on the acquired data. Thereafter, the base station 101 (AP1) stores information based on whether the reception has succeeded or failed in a frame such as block ack (BA (Block Ack)), transmitting the frame to the terminal apparatus 102-1 (STA1) (an arrow 305).

In the case where the reception has failed, the sequence from the arrow 303 to the arrow 305 described above is repeated. It should be noted that in the case where a notice (e.g., Null data) to the effect that the data whose retransmission has been requested had already been discarded is transmitted to the requester as described above, the base station 101 (AP1) may terminate the retransmission request on the basis of the notice. This suppresses increase in unnecessary retransmission requests (requests that cannot be responded to).

The sequence described above also holds in the case where the base station 101 (AP1) and the terminal apparatus 102-1 (STA1) are switched one to another (in the case where the base station 101 (AP1) acquires transmission right and transmits a signal to the terminal apparatus 102-1 (STA1)). In other words, in the description given above, the base station 101 (AP1) and the terminal apparatus 102-1 (STA1) may be switched one to another. Needless to say, the communication counterpart of the base station 101 (AP1) may be the terminal apparatus 102-2 (STA2). In other words, in this case as well, communication can take place by using a similar sequence.

<HARQ Information>

HARQ information includes information regarding the configuration of a retransmission signal. This information regarding the configuration of a retransmission signal may be information of any kind and may include, for example, information regarding data whose retransmission is requested. Also, this information regarding data whose retransmission is requested may be information of any kind and may include, for example, information regarding a data identifier and information regarding a data length.

Information regarding the data identifier may be information of any kind and may include, for example, an MPDU sequence number in the MAC layer.

Information regarding the data length may be information of any kind and may include, for example, a byte length of the MPDU whose identifier is indicated by information regarding the data identifier. Also, for example, information regarding data length may include a block count or a byte length of the coding block including, without excess or deficiency, the MPDU. Further, for example, information regarding the data length may include information such as signal time at an intermediate stage of processing before conversion of the data into bit strings. Needless to say, information regarding the data length may include a plurality of these pieces of information. Also, information regarding the data length may indirectly indicate a length of these pieces of data.

Information regarding data whose retransmission is requested may further include information regarding a data order. This information regarding the data order may be information of any kind and may include, for example, information regarding a data connection order. Also, this information regarding the data order may include, for example, a rule indicating an order of retransmission data and new data. Needless to say, information regarding the data order may include a plurality of these pieces of information. Also, information regarding the data order may indirectly indicate an order of these pieces of data.

Information regarding a configuration of a retransmission signal may further include, for example, information regarding a setting of information synthesis using an original signal and a retransmission signal (i.e., information regarding a synthesis setting through HARQ). This information regarding an HARQ setting may be information of any kind and may include, for example, a notice to the effect that HARQ is used. Also, for example, information regarding the HARQ setting may include an identifier of an HARQ stream, which is a stream such as an image or sound to be subjected to HARQ. By using this identifier, it is possible to suppress erroneous synthesis of retransmission data with irrelevant stream data.

Also, information regarding the HARQ setting may include an HARQ scheme notice (notice of a synthesis scheme used) such as Chase Combining or Incremental Redundancy. A synthesis specification becomes apparent from this notice, thus allowing for generation of retransmission data with higher efficiency.

Needless to say, information regarding the HARQ setting may include a plurality of these pieces of information.

<Frame Format of HARQ Information>

Figure 5:
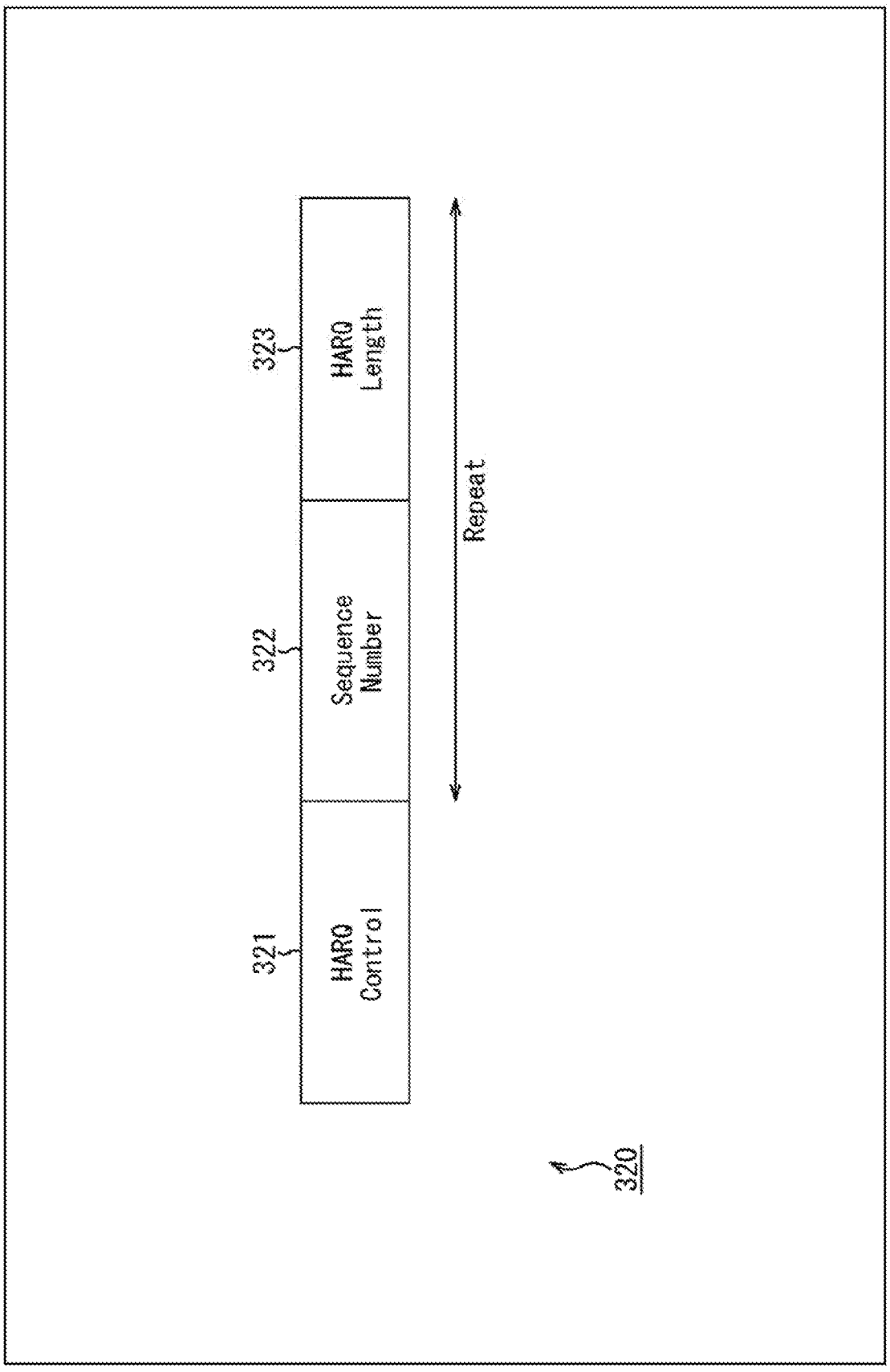
FIG. 5 is a diagram illustrating an example of a frame format by which HARQ information is notified.

FIG. 5 illustrates an example of a frame format by which HARQ information is notified, the HARQ information being transmitted from the communication apparatus 200 on the side requesting retransmission of a signal as described above (receiving side) (base station 101 (AP1) in the case of the example illustrated in FIG. 4) to the communication apparatus 200 on the signal retransmission side (terminal apparatus 102-1 (STA1) in the case of the example illustrated in FIG. 4) as described above.

As illustrated in FIG. 5, a frame 320 transmitting HARQ information has three frames, namely, an HARQ control 321 (HARQ Control), a sequence number 322 (Sequence Number), and an HARQ length 323 (HARQ Length).

The HARQ control 321 (HARQ Control) includes information regarding the HARQ setting. The sequence number 322 (Sequence Number) includes information regarding an identifier of data to be transmitted. The HARQ length 323 (HARQ Length) includes information regarding a length of data to be transmitted.

It should be noted that the sequence number 322 (Sequence Number) and the HARQ length 323 (HARQ Length) may be repeated as many times as the number of pieces of data whose retransmission is requested on the basis of HARQ information.

Figure 6:
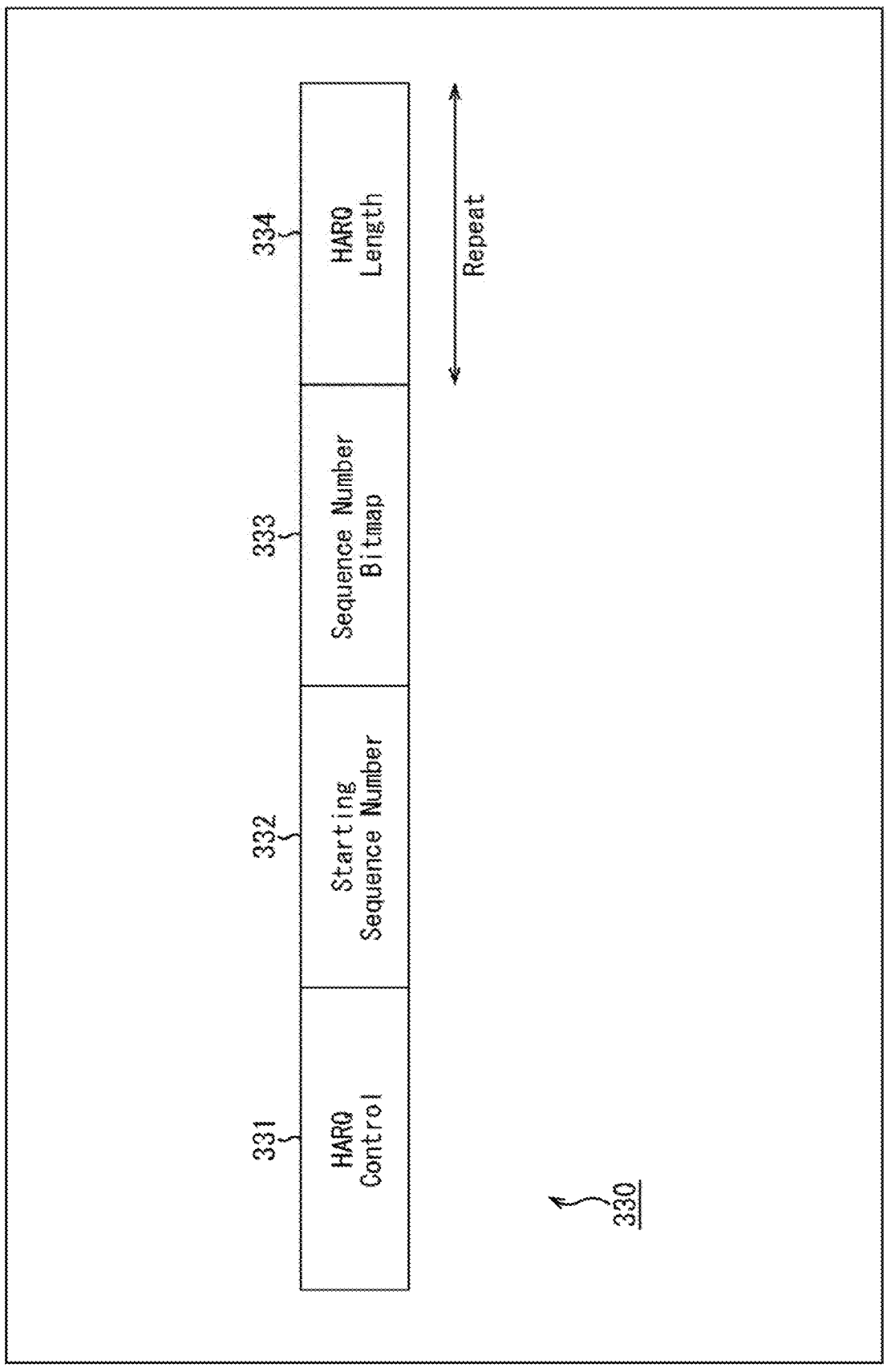
FIG. 6 is a diagram illustrating an example of a frame format by which HARQ information is notified.

FIG. 6 is a diagram illustrating another configuration example of a frame format by which HARQ information is notified. A frame 330 transmitting HARQ information, which is illustrated in FIG. 6, has four frames, namely, an HARQ control 331 (HARQ Control), a starting sequence number 332 (Starting Sequence Number), a sequence number bitmap 333 (Sequence Number Bitmap), and an HARQ length 334 (HARQ Length).

The HARQ control 331 (HARQ Control) includes information similar to that of the HARQ control 321 illustrated in FIG. 5. The HARQ length 334 (HARQ Length) includes information similar to that of the HARQ length 323 (HARQ Length) illustrated in FIG. 5.

The starting sequence number 332 (Starting Sequence Number) includes an identifier of a first piece of a plurality of pieces of data whose retransmission is requested on the basis of HARQ information.

The sequence number bitmap 333 (Sequence Number Bitmap) includes an identifier of a second or succeeding piece of the plurality of pieces of data as information in bitmap (Bitmap) format relative to the identifier of the first piece of data as a reference.

It should be noted that the HARQ length 334 (HARQ Length) may be repeated as many times as the number of pieces of data whose retransmission is requested on the basis of HARQ information. This frame 330 can store information more efficiently than the frame 320 illustrated in FIG. 5 in the case where a plurality of identifiers is stored.

Also, transmitting, as HARQ information, such information as described above with reference to FIGS. 5 and 6 allows for the communication apparatus 200 on the signal retransmission side to generate a signal meeting the requested specification on the basis of this HARQ information and retransmit the signal.

It should be noted that the frame format by which HARQ information is notified is arbitrary and is not limited to the example described above. For example, a frame by which HARQ information is notified may include information other than the above.

Also, a frame by which HARQ information is notified as described above (the frame 320 or the frame 330) may be connected to a Poll frame (or a Trigger frame which will be described later) and transmitted or may be transmitted as part of a Poll frame (or a Trigger frame). Also, a Poll frame (or a Trigger frame) that includes, as part thereof, a frame by which HARQ information is notified may be connected to other Poll frame (or Trigger frame) that does not include any frame by which HARQ information is notified and transmitted.

<Poll Frame>

Figure 7:
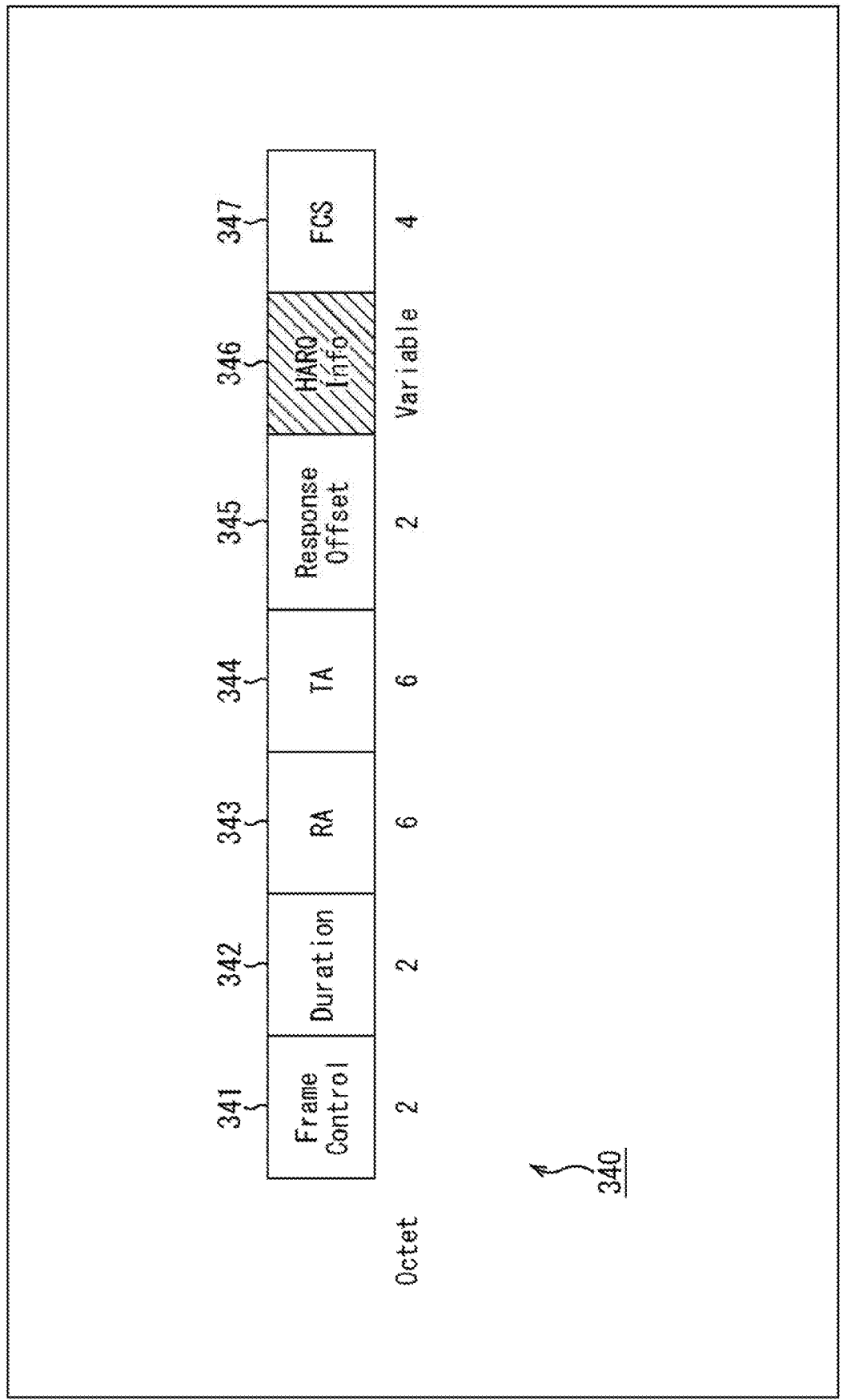
FIG. 7 is a diagram illustrating a configuration example of a Poll frame.

FIG. 7 illustrates an example of a Poll frame that includes, as part thereof, a frame by which HARQ information is notified. As illustrated in FIG. 7, a Poll frame 340 including, as part thereof, a frame by which HARQ information is notified has, for example, a frame control 341 (Frame Control), a duration 342 (Duration), a receiving address 343 (RA), a transmitting address 344 (TA), a response offset 345 (Response Offset), an HARQ information 346 (HARQ Info), and a frame check sequence 347 (FCS (Frame Check Sequence)).

The frame control 341 (Frame Control) includes information regarding MAC frame control. The duration 342 (Duration) includes information regarding an anticipated duration for which to use a wireless line. The receiving address 343 (RA) includes information regarding addresses such as a broadcast address. The transmitting address 344 (TA) includes information regarding a MAC address of the communication apparatus 200, which is the sender.

The response offset 345 (Response Offset) includes information regarding time to signal transmission after reception of a Poll frame. The HARQ information 346 (HARQ Info) includes the frame 320 or the frame 330 (i.e., frame by which HARQ information is notified) described above. The frame check sequence 347 (FCS (Frame Check Sequence)) includes information for carrying out frame error detection and correction.

As described above, HARQ information can be transmitted by using a Poll frame. This makes HARQ information highly compatible with existing communication standards, thus ensuring easy realization.

<Flow of the Retransmission Data Transmission Process>

Figure 8:
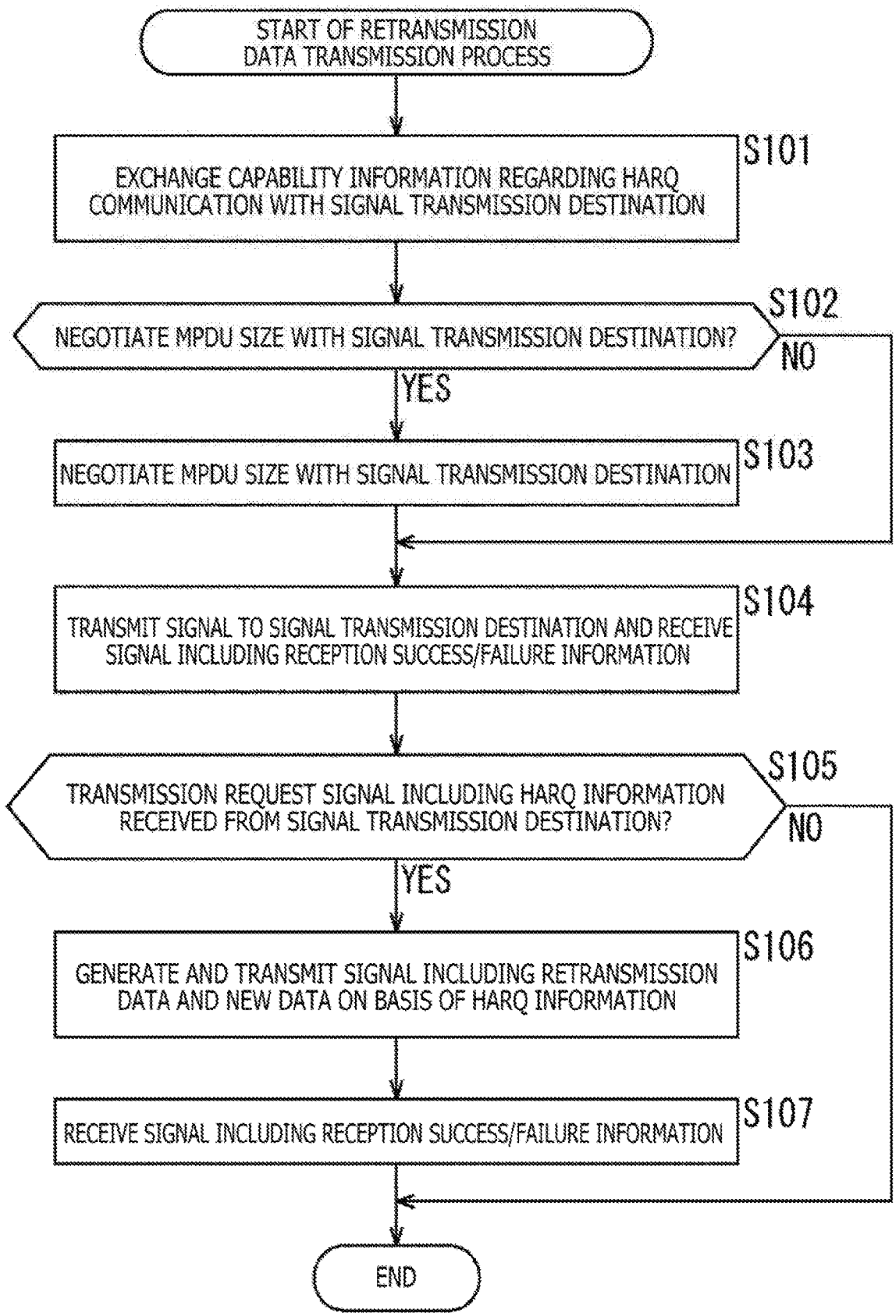
FIG. 8 is a flowchart describing an example of a flow of a retransmission data transmission process.

A description will next be given of the flow of processes performed by the communication apparatus 200 that handles the sequence as described above. A description will first be given of an example of the flow of a retransmission data transmission process carried out by the communication apparatus 200 on the signal retransmission side (terminal apparatus 102-1 (STA1) in the case of the example illustrated in FIG. 4) with reference to the flowchart illustrated in FIG. 8.

When the retransmission data transmission process begins, the communication apparatus 200 exchanges, in step S101, capability information regarding HARQ-based communication (HARQ communication) with the destination of the signal (i.e., the communication apparatus 200, which is the communication counterpart). More specifically, the control section 201 manages capability information regarding HARQ communication of the communication apparatus 200 in question. The control section 201 supplies the capability information to the wireless communication section 203 via the data processing section 202, causing the wireless communication section 203 to exchange the capability information with the communication apparatus 200, which is the communication counterpart. As a result of this exchange of capability information, the communication apparatus 200 can find out about the capability of the communication apparatus 200, which is the communication counterpart, regarding HARQ communication (for example, whether or not the communication counterpart is capable of HARQ communication).

The control section 201 determines, in step S102, whether or not to negotiate the MPDU size with the communication apparatus 200, which is the communication counterpart. For example, in the case where it is determined that the communication apparatus 200, which is the communication counterpart, is capable of HARQ communication and that the control section 201 will proceed with MPDU size negotiation, the process proceeds to step S103.

In step S103, the control section 201 controls the data processing section 202 and the wireless communication section 203 to negotiate the MPDU size with the communication apparatus 200, which is the communication counterpart. When the process in step S103 ends, the process proceeds to step S104. Also, in the case where it is determined that the MPDU size will not be negotiated in step S102, the process in step S103 is omitted, and the process proceeds to step S104.

In step S104, the control section 201 controls the data processing section 202 and the wireless communication section 203 to transmit a signal and receive a signal including reception success/failure information transmitted from the communication apparatus 200, which is the communication counterpart, in response to the signal transmission. For example, in the case of the sequence illustrated in FIG. 4, the exchange of signals as indicated by the arrow 301 and the arrow 302 takes place.

In step S105, the control section 201 determines whether or not a retransmission request signal including HARQ information (transmission request frame) has been received from the communication apparatus 200, which is the communication counterpart. For example, in the case where it is determined that a Poll frame including HARQ information has been received as indicated by the arrow 303 in the sequence example illustrated in FIG. 4, the process proceeds to step S106.

In step S106, the control section 201 extracts HARQ information from the data of the received Poll frame and generates retransmission information on the basis of the extracted HARQ information. The control section 201 supplies the retransmission information to the data processing section 202, causing the data processing section 202 to generate retransmission data. The control section 201 controls the wireless communication section 203 to generate a signal including the retransmission data and new data, transmitting the signal to the communication apparatus 200, which is the communication counterpart, as indicated, for example, by the arrow 304 in the sequence example illustrated in FIG. 4. In other words, the communication apparatus 200 creates a signal including the retransmission data and new data for transmission such that the signal includes data as specified by HARQ information.

It should be noted that in the case where the data whose retransmission has been requested had already been discarded, the control section 201 may control the data processing section 202 and the wireless communication section 203 to transmit Null data in place of transmitting a signal including the retransmission data and new data.

In step S107, the control section 201 controls the data processing section 202 and the wireless communication section 203 to receive a signal including reception success/failure information transmitted from the communication apparatus 200, which is the communication counterpart, in response to the signal transmission as indicated, for example, by the arrow 305 in the sequence example illustrated in FIG. 4.

When the process in step S107 ends, the retransmission data transmission process ends. Also, in the case where it is determined in step S105 that a retransmission request signal including HARQ information has yet to be received from the communication apparatus 200, which is the communication counterpart, the retransmission data transmission process ends.

It should be noted that in the case where it is determined on the basis of reception success/failure information received in step S107 that the communication counterpart has failed in the reception of a retransmission signal, the communication apparatus 200 may repeat the processes from step S105 to step S107 until the communication counterpart successfully receives a retransmission signal, until a given period of time elapses, or until the data is discarded.

<Flow of the Retransmission Data Reception Process>

Figure 9:
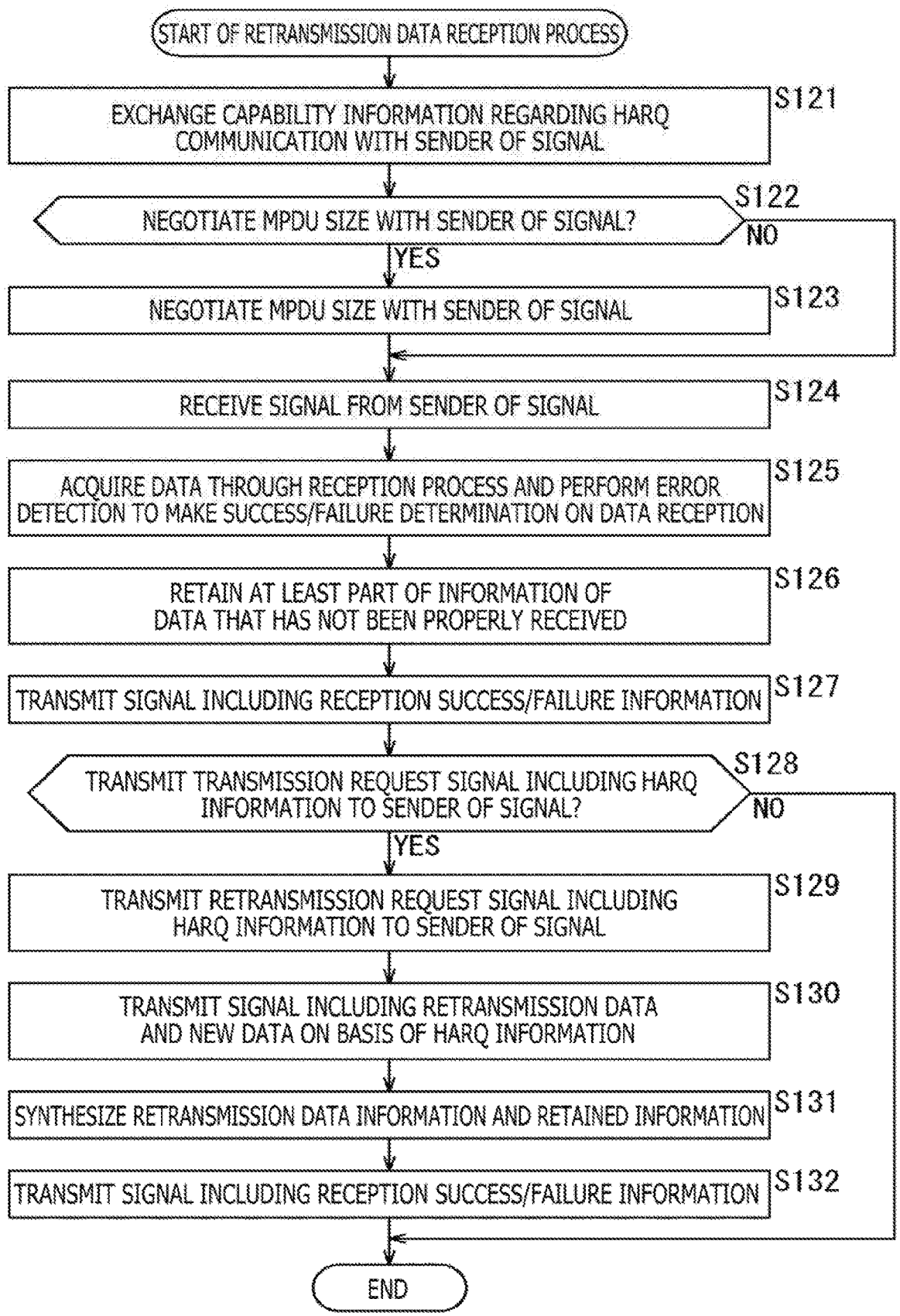
FIG. 9 is a flowchart describing an example of a flow of a retransmission data reception process.

A description will next be given of an example of a flow of a retransmission data reception process performed by the communication apparatus 200 on the signal retransmission requesting side (base station 101 (AP1) in the case of the example illustrated in FIG. 4) with reference to the flowchart illustrated in FIG. 9.

When the retransmission data reception process begins, the communication apparatus 200 exchanges, in step S121, capability information regarding HARQ communication with the sender of the signal (i.e., the communication apparatus 200, which is the communication counterpart). More specifically, the control section 201 manages capability information regarding HARQ communication of the communication apparatus 200 in question. The control section 201 supplies the capability information to the wireless communication section 203 via the data processing section 202, causing the wireless communication section 203 to exchange the capability information with the communication apparatus 200, which is the communication counterpart. As a result of this exchange of capability information, the communication apparatus 200 can find out about the capability of the communication apparatus 200, which is the communication counterpart, regarding HARQ communication (for example, whether or not the communication counterpart is capable of HARQ communication).

The control section 201 determines, in step S122, whether or not to negotiate the MPDU size with the communication apparatus 200, which is the communication counterpart. For example, in the case where it is determined that the communication apparatus 200, which is the communication counterpart, is capable of HARQ communication and that the control section 201 will proceed with MPDU size negotiation, the process proceeds to step S123.

In step S123, the control section 201 controls the data processing section 202 and the wireless communication section 203 to negotiate the MPDU size with the communication apparatus 200, which is the communication counterpart. When the process in step S123 ends, the process proceeds to step S124. Also, in the case where it is determined that the MPDU size will not be negotiated in step S122, the process in step S123 is omitted, and the process proceeds to step S124.

In step S124, the control section 201 controls the data processing section 202 and the wireless communication section 203 to receive a signal normally transmitted from the sender. In step S125, the control section 201 controls the data processing section 202 and the wireless communication section 203 to acquire data from the received signal, perform error detection on one or more pieces of the acquired data such as an MPDU, and determine whether the data reception has succeeded or failed.

In the case where it is determined that the demodulation of data has failed as a result of the process in step S125, the control section 201 controls the data processing section 202 or the wireless communication section 203 in step S126 to retain, by treating the signal whose demodulation has failed as an original signal, at least part of the original signal at an intermediate stage of processing or at least part of the bit strings of the original data corresponding to the original signal without discarding the original signal.

In step S127, the control section 201 controls the data processing section 202 and the wireless communication section 203 to transmit reception success/failure information corresponding to the original data.

In step S128, the control section 201 determines whether or not to transmit a transmission request frame including HARQ information to the sender of the original signal. In the case where it is determined that a transmission request frame is transmitted, the process proceeds to step S129.

In step S129, the control section 201 calculates at least any one of start and end points of data that was not properly received (data whose demodulation has failed), start and end points of a coding unit including an error, or start and end points of a bit string including an error. Then, the control section 201 sets (generates) HARQ information on the basis of a calculation result thereof such that the same data, the coding unit, or the bit string can be estimated in the retransmitted signal. The control section 201 supplies the HARQ information to the data processing section 202 and controls the data processing section 202 and the wireless communication section 203 to transmit a Poll frame including the HARQ information to the sender of the retransmission data.

In step S130, the control section 201 controls the wireless communication section 203 to receive a signal including new data and the retransmission data generated on the basis of the transmitted HARQ information.

In step S131, the control section 201 controls the data processing section 202 and the wireless communication section 203 (modulation/demodulation section 211) to synthesize information by using the retransmission data (or the retransmission signal) and retained data (or the retained signal) on the basis of the HARQ information.

In step S132, the control section 201 controls the data processing section 202 and the wireless communication section 203 to generate a signal including reception success/failure information for the signal and transmit the signal to the sender of the retransmission data.

When the process in step S132 ends, the retransmission data reception process ends. Also, in the case where it is determined in step S128 that a transmission request frame (Poll frame) will be not be transmitted, the processes from step S129 to step S132 are omitted, and the retransmission data reception process ends.

It should be noted that in the case where the demodulation of the signal received in step S130 fails, the processes from step S128 to step S132 may be repeated until a retransmission signal is successfully received, until a given period of time elapses, or until given data (e.g., Null data) is received.

By performing each of the processes as described above, the communication apparatus 200 can realize information synthesis by using an original signal and a retransmission signal for retransmitting information of the original signal whose demodulation has failed, in wireless communication with its physical layer and MAC layer independent of each other, without requiring additional information in a physical layer header. This, therefore, suppresses increase in overhead. Further, this suppresses increase in buffer consumption and power consumption. Further, this suppresses increase in resource consumption attributable to retransmission.

<Sequence>

Although the description has been given above by taking, as an example, the sequence illustrated in FIG. 4, the example illustrated in FIG. 4 is merely an example, and the present technology is applicable to other sequences in addition to the sequence illustrated in FIG. 4.

Figure 10:
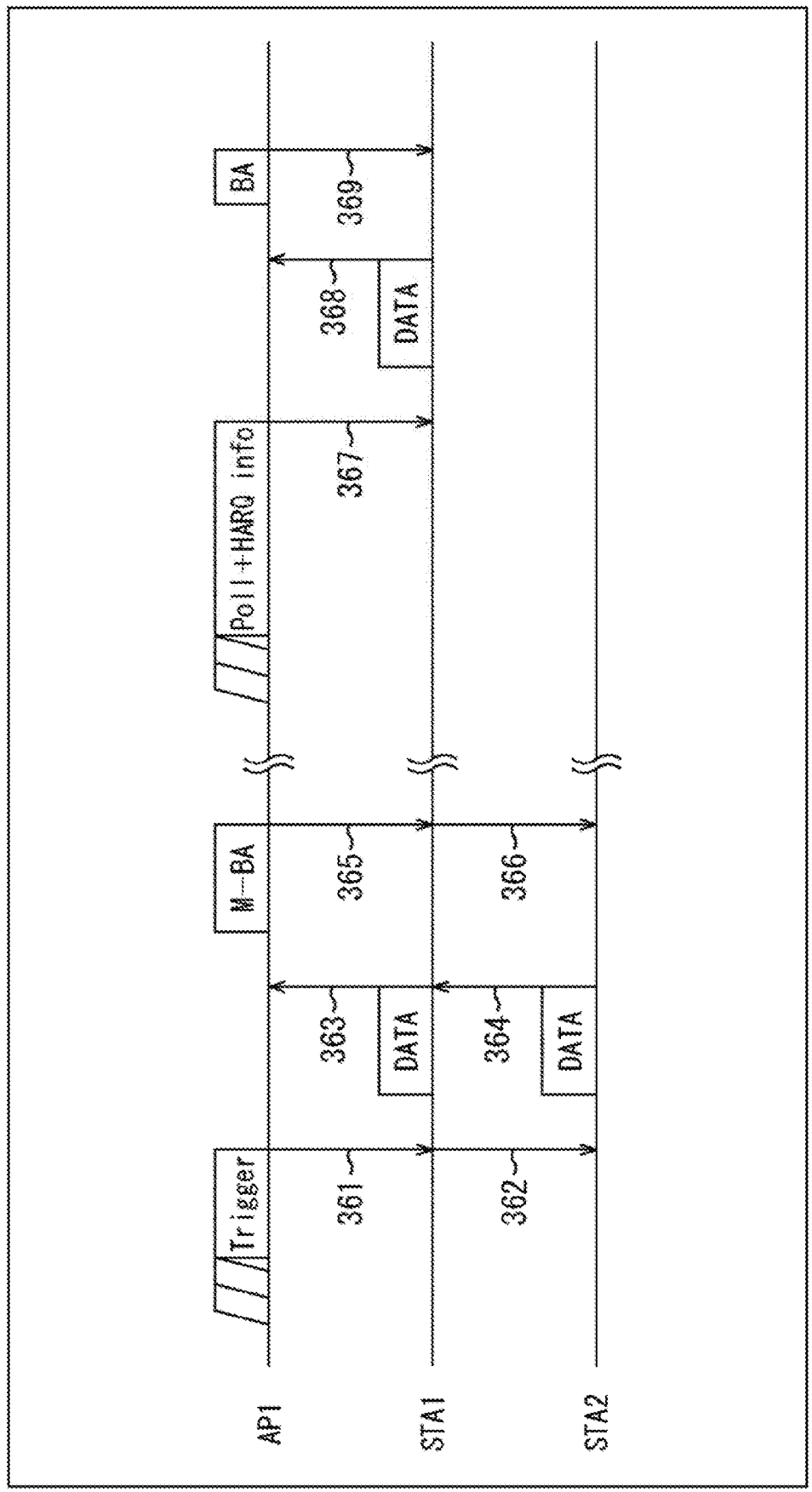
FIG. 10 is a diagram describing an example of a communication sequence.

For example, single user communication using a Poll frame may be carried out in part of communication. A sequence example in this case is illustrated in FIG. 10. In the case of the example illustrated in FIG. 10, the base station 101 (AP1) engages in uplink multi-user communication using a trigger frame (hereinafter referred to as a Trigger frame) with the terminal apparatus 102-1 (STA1) and the terminal apparatus 102-2 (STA2), which are subordinate units of the base station 101. It should be noted, however, that a retransmission request is issued by using a Poll frame that is transmitted to a single terminal as in the case illustrated in FIG. 4.

Also in this case, capability information regarding HARQ communication may be exchanged and the MPDU size in the MAC layer may be negotiated between the communication apparatuses 200 (between the base station 101 (AP1) and the terminal apparatus 102-1 (STA1) and between the base station 101 (AP1) and the terminal apparatus 102-2 (STA2)) before the present sequence begins as in the case of the example illustrated in FIG. 4.

The base station 101 (AP1) transmits, to the terminal apparatus 102-1 (STA1) and the terminal apparatus 102-2 (STA2), a Trigger frame including information for carrying out uplink multi-user communication (UL OFDMA, UL MU-MIMO) (a terminal identifier, a frequency/space resource, and so on), thus initiating an uplink multi-user communication sequence (an arrow 361 and an arrow 362).

When this Trigger frame is received, the terminal apparatus 102-1 (STA1) and the terminal apparatus 102-2 (STA2) proceed with uplink multi-user transmission on the basis of information included in the Trigger frame (an arrow 363 and an arrow 364).

The base station 101 (AP1) that received a signal transmitted through uplink multi-user transmission acquires one or more pieces of data such as an MPDU by performing a reception process on the signal, carrying out error detection and determining whether the data reception has succeeded or failed.

Thereafter, the base station 101 (AP1) stores information based on whether the reception has succeeded or failed in a multi-STA block ack (M-BA (Multi-STA Block Ack)), transmitting the frame to the terminal apparatus 102-1 (STA1) and the terminal apparatus 102-2 (STA2) (an arrow 365 and an arrow 366).

Here, in the case where a signal whose demodulation has failed exists, the base station 101 (AP1) treats the signal as an original signal and retains, without discarding, at least part of the bit strings of the original data corresponding to the original signal or at least part of the original signal at an intermediate stage of processing. For example, the signal retention section 232 retains the original signal.

Then, as in the case of the example illustrated in FIG. 4, the base station 101 (AP1) transmits, to the sender of the original signal (the terminal apparatus 102-1 (STA1) or the terminal apparatus 102-2 (STA2)), a Poll frame including HARQ information (HARQ info) as a retransmission request signal (retransmission request frame) requesting the signal retransmission. In the example illustrated in FIG. 10, it is assumed that the demodulation of a signal from the terminal apparatus 102-1 (STA1) has failed, and the base station 101 (AP1) transmits a Poll frame including HARQ information (HARQ info) to the terminal apparatus 102-1 (STA1) (an arrow 367).

It should be noted that in the case where the data whose retransmission has been requested had already been discarded, the terminal apparatus 102 may notify the requester that the data has already been discarded. For example, Null data may be transmitted as this notice.

As in the case illustrated in FIG. 4, the terminal apparatus 102-1 (STA1) that received the Poll frame including HARQ information generates data (retransmission data) regarding requested information to be retransmitted (retransmission information) in accordance with the HARQ information and generates a signal including the retransmission data and new data (a signal including a retransmission signal), transmitting the signal to the base station 101 (AP1) (an arrow 368).

As in the case illustrated in FIG. 4, the base station 101 (AP1) that received the signal performs a reception process on the signal in accordance with HARQ information notified by the base station 101 (AP1) itself, thus extracting the retransmission signal and synthesizing information through HARQ. In other words, the base station 101 (AP1) synthesizes information by using the retained signal and the retransmission signal.

As in the case illustrated in FIG. 4, the base station 101 (AP1) performs error detection on the acquired data and determines whether or not the reception of the acquired data has succeeded or failed. Thereafter, the base station 101 (AP1) stores information based on whether the reception has succeeded or failed in a frame such as block ack (BA (Block Ack)), transmitting the frame to the terminal apparatus 102-1 (STA1) (an arrow 369).

In the case where the reception has failed, the sequence from the arrow 367 to the arrow 369 described above is repeated. It should be noted that in the case where a notice (e.g., Null data) to the effect that the data whose retransmission was requested had already been discarded is transmitted to the requester as described above, the base station 101 (AP1) may terminate the retransmission request on the basis of the notice. This suppresses increase in unnecessary retransmission requests (requests that cannot be responded to).

The sequence described above also holds in the case where the base station 101 (AP1) and the terminal apparatus 102-1 (STA1) are switched one to another (in the case where the base station 101 (AP1) acquires transmission right and transmits a signal to the terminal apparatus 102-1 (STA1) or the terminal apparatus 102-2 (STA2)). In other words, in the description given above, the base station 101 (AP1) and the terminal apparatus 102 may be switched one to another. Needless to say, in the case where the base station 101 (AP1) fails in the demodulation of a signal from the terminal apparatus 102-2 (STA2), communication can take place by using a similar sequence.

<Sequence>

Figure 11:
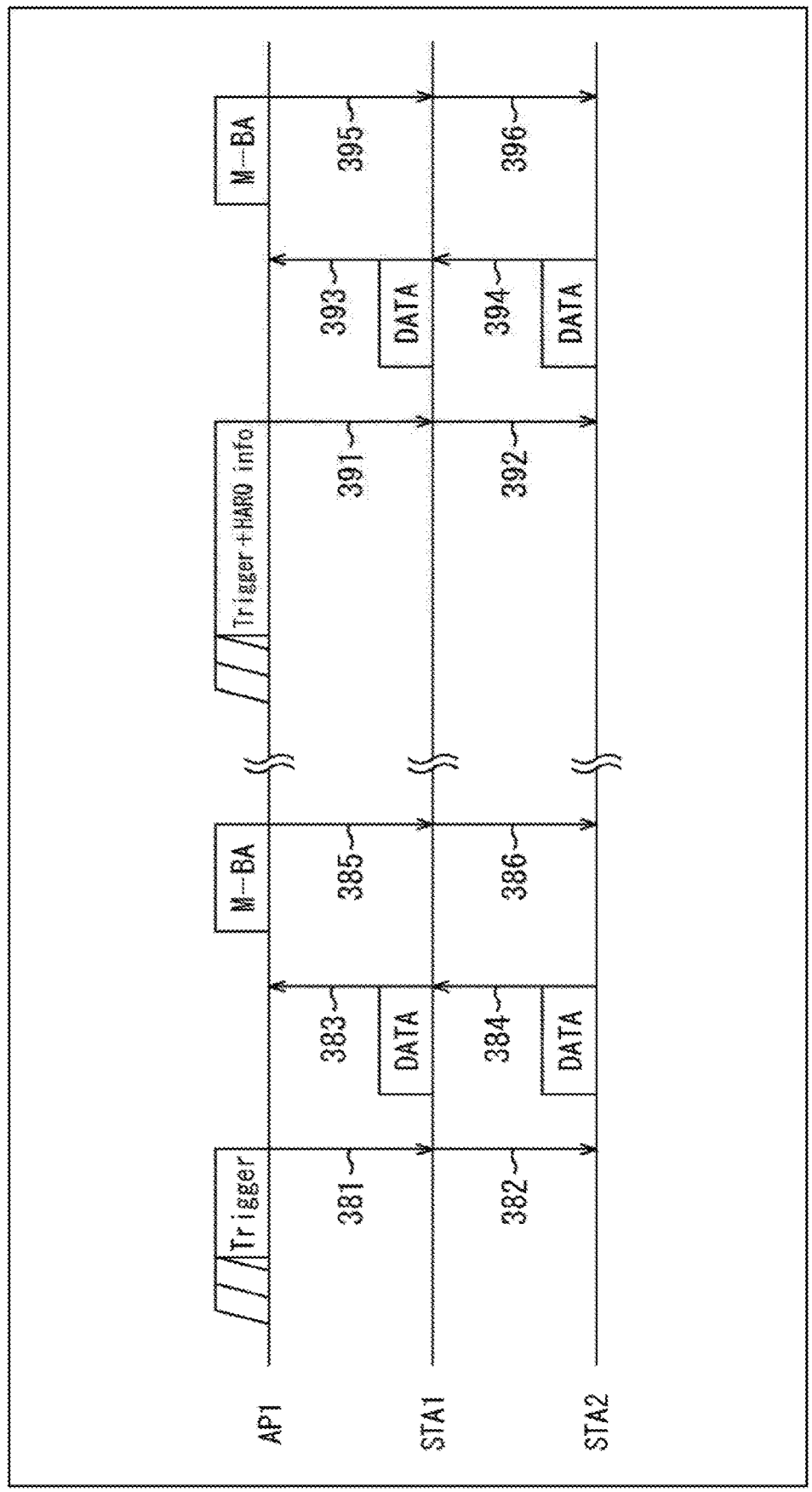
FIG. 11 is a diagram describing an example of a communication sequence.

Further, for example, uplink multi-user communication using a Trigger frame may be carried out for all communication. A sequence example in this case is illustrated in FIG. 11. In the case of the example illustrated in FIG. 11, communication is basically carried out by using a sequence similar to that in the case of the example illustrated in FIG. 10, and a retransmission request is also issued by using a Trigger frame.

Also in this case, capability information regarding HARQ communication may be exchanged and the MPDU size in the MAC layer may be negotiated between the communication apparatuses 200 (between the base station 101 (AP1) and the terminal apparatus 102-1 (STA1) and between the base station 101 (AP1) and the terminal apparatus 102-2 (STA2)) before the present sequence begins as in the cases of the examples illustrated in FIGS. 4 and 10.

Then, the base station 101 (AP1) transmits, to the terminal apparatus 102-1 (STA1) and the terminal apparatus 102-2 (STA2), a Trigger frame including information for carrying out uplink multi-user communication (UL OFDMA, UL MU-MIMO) (a terminal identifier, a frequency/space resource, and so on), thus initiating an uplink multi-user communication sequence (an arrow 381 and an arrow 382).

When this Trigger frame is received, the terminal apparatus 102-1 (STA1) and the terminal apparatus 102-2 (STA2) proceed with uplink multi-user transmission on the basis of information included in the Trigger frame (an arrow 383 and an arrow 384).

The base station 101 (AP1) that received a signal transmitted through uplink multi-user transmission acquires one or more pieces of data such as an MPDU by performing a reception process on the signal, carrying out error detection and determining whether the data reception has succeeded or failed.

Thereafter, the base station 101 (AP1) stores information based on whether the reception has succeeded or failed in a frame such as a multi-STA block ack (M-BA (Multi-STA Block Ack)), transmitting the frame to the terminal apparatus 102-1 (STA1) and the terminal apparatus 102-2 (STA2) (an arrow 385 and an arrow 386).

Here, in the case where a signal whose demodulation has failed exists, the base station 101 (AP1) treats the signal as an original signal and retains, without discarding, at least part of the bit strings of the original data corresponding to the original signal or at least part of the original signal at an intermediate stage of processing. For example, the signal retention section 232 retains the original signal.

The sequence is similar to that in the case of the example illustrated in FIG. 10 up to this point.

Here, the base station 101 (AP1) transmits, to the senders of the original signal (the terminal apparatus 102-1 (STA1) and the terminal apparatus 102-2 (STA2)), a Trigger frame including HARQ information (HARQ info) as a retransmission request signal (retransmission request frame) requesting retransmission of a signal in order to carry out new uplink multi-user communication including data whose demodulation has failed (an arrow 391 and an arrow 392).

When this Trigger frame including HARQ information is received, each of the terminal apparatus 102-1 (STA1) and the terminal apparatus 102-2 (STA2) generates data (retransmission data) regarding requested information to be retransmitted (retransmission information) in accordance with the HARQ information and generates a signal including the retransmission data and new data (a signal including a retransmission signal), transmitting the signal to the base station 101 (AP1) (an arrow 393 and an arrow 394).

It should be noted that in the case where the data whose retransmission has been requested had already been discarded, the terminal apparatus 102 may notify the requester that the data has already been discarded. For example, Null data may be transmitted as this notice.

The base station 101 (AP1) that received the signal performs a reception process on the signal in accordance with HARQ information notified by the base station 101 (AP1) itself, thus extracting the retransmission signal as in the cases illustrated in FIGS. 4 and 10. The base station 101 (AP1) synthesizes information by using the original signal and the retransmission signal through HARQ, acquiring data such as an MPDU. For example, the base station 101 (AP1) synthesizes the retained signal (original signal) and the retransmission signal in the form of bit strings of data such as an MPDU or at an intermediate stage of processing before conversion into bit strings in accordance with HARQ information and demodulates the resultant data or performs other processes, thus acquiring data. Also, for example, the base station 101 (AP1) synthesizes the retransmission data, acquired, for example, by demodulating the retransmission signal, with the retained data (original data) in accordance with HARQ information.

The base station 101 (AP1) determines whether the data reception has succeeded or failed by performing error detection on the acquired data. Thereafter, the base station 101 (AP1) stores information based on whether the reception has succeeded or failed in a frame such as multi-STA block ack (M-BA (Multi-STA Block Ack)), transmitting the frame to the terminal apparatus 102-1 (STA1) and the terminal apparatus 102-2 (STA2) (an arrow 395 and an arrow 396).

In the case where the reception has failed, the sequence from the arrow 391 to the arrow 396 described above is repeated. It should be noted that in the case where a notice (e.g., Null data) to the effect that the data whose retransmission was requested had already been discarded is transmitted to the requester as described above, the base station 101 (AP1) may terminate the retransmission request on the basis of the notice. This suppresses increase in unnecessary retransmission requests (requests that cannot be responded to).

It should be noted that, in the case of the example illustrated in FIG. 11, only the base station 101, which is the parent unit, can transmit a Trigger frame. Therefore, this sequence is applicable only in the case where data is transmitted from the terminal apparatus 102 to the base station 101 as in FIG. 11.

<Trigger frame>

Figure 12A:
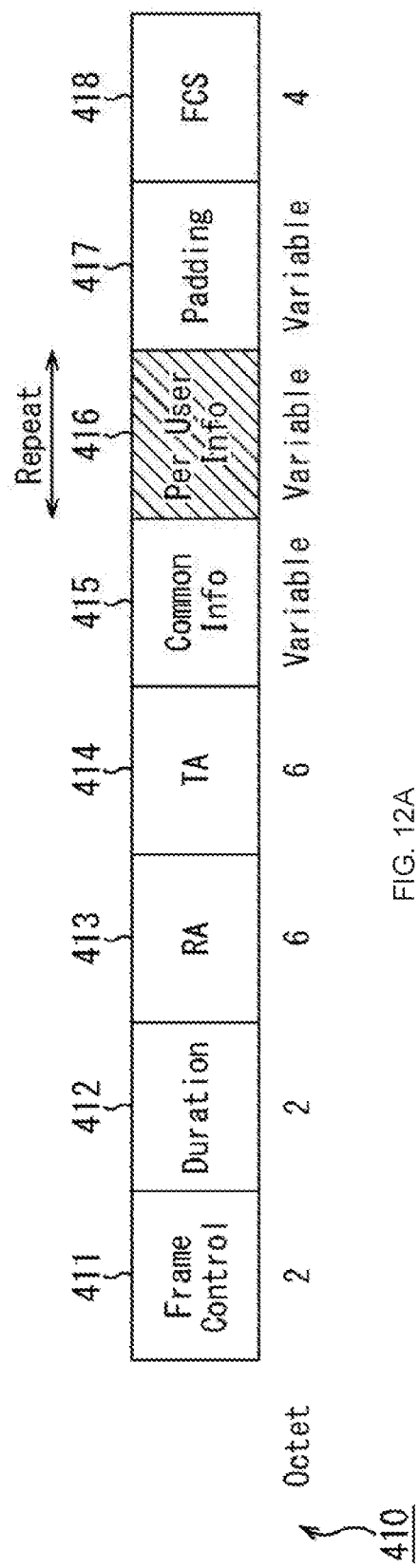
FIGS. 12A and 12B depict diagrams illustrating a configuration example of a Trigger frame.
Figure 12B:
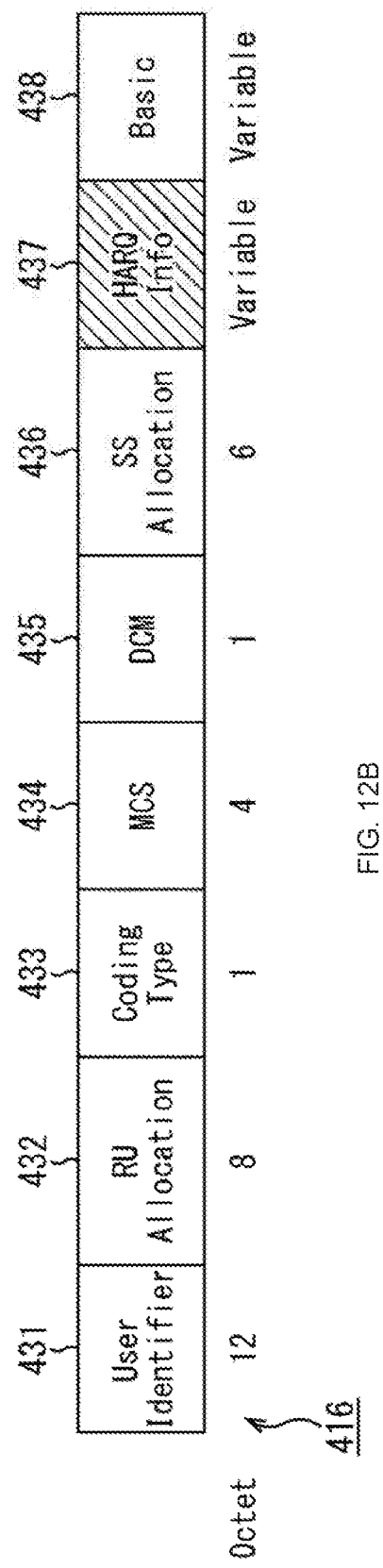

FIGS. 12A and 12B illustrate an example of a Trigger frame that includes, as part thereof, a frame by which HARQ information is notified. As illustrated in A of FIG. 12A, a Trigger frame 410 has, for example, a frame control 411 (Frame Control), a duration 412 (Duration), a receiving address 413 (RA), a transmitting address 414 (TA), common information 415 (Common Info), user information 416 (Per User Info), padding 417 (Padding), and a frame check sequence 418 (FCS).

The frame control 411 stores information similar to that in the case of the frame control 341. The duration 412 stores information similar to that in the case of the duration 342. The receiving address 413 stores information similar to that in the case of the receiving address 343. The transmitting address 414 stores information similar to that in the case of the transmitting address 344.

The common information 415 stores information (PPDU length and physical layer frame header information) that can be referenced by all the terminal apparatuses 102 (all STAs) that received the Trigger frame. The user information 416 stores information individually referenced by the terminal apparatuses 102 (STAs) that received the Trigger frame.

The padding 417 stores information for adjusting the frame length. The frame check sequence 418 stores information similar to that in the case of the frame check sequence 347.

As illustrated in FIG. 12B, the user information 416 (Per User Info) has, for example, a user identifier 431 (User Identifier), an RU allocation 432 (RU (Resource Unit) Allocation), a coding type 433 (Coding Type), a modulation coding scheme 434 (MCS (Modulation Coding Scheme)), a dual carrier modulation (Dual Carrier Modulation), an SS allocation (SS allocation) 436, an HARQ information 437 (HARQ info), and a basic 438 (Basic).

The user identifier 431 (User Identifier) stores information regarding an identifier (Association ID) of the terminal apparatus 102 (STA). The RU allocation 432 (RU (Resource Unit) Allocation) stores information regarding a frequency (Resource Unit) used for transmission.

The coding type 433 (Coding Type) stores information regarding a coding type used for the signal to be transmitted. The modulation coding scheme 434 (MCS (Modulation Coding Scheme)) stores information regarding an MCS used for the signal to be transmitted. The dual carrier modulation (DCM (Dual Carrier Modulation)) stores information regarding whether or not DCM is used for the signal to be transmitted.

As described above, the transmission of information regarding a coding and decoding scheme and a modulation and demodulation scheme together with HARQ information allows for the communication apparatus 200 on the receiving side of retransmission data to acquire retransmission data compliant with a desired coding and decoding scheme and modulation and demodulation scheme. In other words, the communication apparatus 200 on the transmitting side of retransmission data can transmit retransmission data compliant with a desired coding and decoding scheme and modulation and demodulation scheme.

The SS allocation (SS allocation) 436 stores information regarding a spatial stream of the signal to be transmitted. The HARQ information 437 (HARQ info) stores information similar to that in the case of the HARQ information 346. The basic 438 (Basic) includes information used in the case where a normal transmission request, which is not a request for retransmission based on HARQ information, is issued. In the case where a normal retransmission request is not issued, Basic may be omitted.

Also, for example, information specifying the communication apparatus 200, which is the destination, as does a BSS (Basic Service Set) identifier, may be transmitted together with HARQ information. This prevents transmission of retransmission requests (transmission frames) to the wrong communication apparatuses 200 (transmission of retransmission signals from the communication apparatuses 200 that are not communication counterparts).

As described above, HARQ information can be transmitted by using a Trigger frame. Therefore, high compatibility is achieved with existing communication standards, thus ensuring easy realization.

<Effect>

As described above, the application of the present technology realizes HARQ-based retransmission in a communication system in which a physical layer and a transport layer are independent of each other. The physical layer handles modulation and demodulation processes and coding and decoding processes on received signals. The transport layer includes a MAC layer that identifies details and an order of signals. Also, HARQ-based retransmission can be realized without adding information to a physical layer header. Also, a suitable data unit size can be used to realize HARQ-based retransmission.

Also, the receiving side decides on its own how to use HARQ. This eliminates the need for the receiving side to be on standby constantly for HARQ processes, thus contributing to reduced buffer consumption and power consumption. Also, it becomes possible to detect data discarded by the transmitting side, thus suppressing buffer consumption.

Also, the use of HARQ makes it possible to suppress resource consumption attributable to retransmission. This makes it possible to achieve improved communication quality, improved throughput, reduced error rate, reduced power consumption, increased number of units accommodated, and reduced interference of the system as a whole.

As described above, the application of the present technology allows for synthesis of information using an original signal and a retransmission signal for retransmitting information of the original signal whose demodulation has failed, in wireless communication with independent physical layer and MAC layer.

It should be noted that although the description has been given above by taking, as an example, a wireless LAN, the present technology can find application in any wireless communication with independent physical layer and MAC layer.

2. Others

<Computer>

The above series of processes can be performed by hardware or software. Also, some of the processes can be performed by hardware, and other processes can be performed by software. In the case where the series of processes is performed by software, the program included in the software is installed to a computer. Here, the computer includes a computer incorporated in dedicated hardware and a general-purpose personal computer capable of executing various functions by installing various types of programs.

FIG. 13 is a block diagram illustrating a hardware configuration example of a computer for performing the above series of processes by using a program.

In a computer 900 illustrated in FIG. 13, a CPU (Central Processing Unit) 901, a ROM (Read Only Memory) 902, and a RAM (Random Access Memory) 903 are connected to each other via a bus 904.

An input-output interface 910 is also connected to the bus 904. An input section 911, an output section 912, a storage section 913, a communication section 914, and a drive 915 are connected to the input-output interface 910.

The input section 911 includes, for example, a keyboard, a mouse, a microphone, a touch panel, an input terminal, and so on. The output section 912 includes, for example, a display, a speaker, an output terminal, and so on. The storage section 913 includes, for example, a hard disk, a RAM disk, a non-volatile memory, and so on. The communication section 914 includes, for example, a network interface. The drive 915 drives a removable medium 921 such as a magnetic disk, an optical disc, a magneto-optical disk, or a semiconductor memory.

In the computer configured as described above, the series of processes described above is performed as the CPU 901 loads the program stored in the storage section 913 into the RAM 903 via the input-output interface 910 and the bus 904 for execution, for example. The RAM 903 also stores, as appropriate, data required for the CPU 901 to perform various processes.

The program executed by the computer (CPU 901) can be recorded, for example, to the removable medium 921 as a package medium or other media for use. In this case, the program can be installed to the storage section 913 via the input-output interface 910 by inserting the removable medium 921 into the drive 915. Also, this program can be provided via a wired or wireless transmission medium such as a local area network, the Internet, or digital satellite broadcasting. In this case, the program can be received by the communication section 914 and installed to the storage section 913. In addition to the above, this program can be installed in advance to the ROM 902 or the storage section 913.

<Supplement>

An embodiment of the present technology is not limited to that described above and may be altered in various ways without departing from the gist of the present technology.

For example, the present technology can be carried out as any kind of components included in an apparatus or a system such as a processor as a system LSI (Large Scale Integration), a module using the plurality of processors, a unit using a plurality of the modules, a set to which other functions have been added to the unit, and so on (i.e., component included as part of the apparatus).

It should be noted that, in the present specification, the term "system" refers to a set of a plurality of components (e.g., apparatuses, modules (parts)), and it does not matter whether or not all the components are provided in the same housing. Therefore, a plurality of apparatuses accommodated in separate housings and connected to each other via a network and a single apparatus having a plurality of modules accommodated in a single housing are both systems.

Also, for example, a component described as a single apparatus (or a processing section) may be divided into a plurality of apparatuses (processing sections). Conversely, components described above as a plurality of apparatuses (processing sections) may be combined into a single apparatus (or a processing section). Also, a component other than those described above may be added to each of the apparatuses (or each of the processing sections). Further, as long as the components or operations of the system as a whole remain substantially the same, some components of a certain apparatus (or a processing section) may be included in components of another apparatus (or another processing section).

Also, for example, the present technology can have a cloud computing configuration in which one function is processed by a plurality of apparatuses via a network in a shared and cooperative manner.

Also, for example, the above program can be executed by an arbitrary apparatus. In this case, it is only necessary to ensure that the apparatus has required functions (e.g., functional blocks) and can gain required information.

Also, for example, each of the steps described in the above flowcharts can be performed not only by a single apparatus but also by a plurality of apparatuses in a shared manner. Further, in the case where a single step includes a plurality of processes, the plurality of processes included in the single step can be performed not only by a single apparatus but also by a plurality of apparatuses in a shared manner. In other words, the plurality of processes included in a single step can be performed as processes of a plurality of steps. Conversely, the processes described as the plurality of steps can be combined and executed as a single step.

It should be noted that the program executed by the computer may perform the processes chronologically according to the order described in the present specification, may perform in parallel, or may perform when necessary as when invoked. In other words, unless inconsistency arises, the processes of the respective steps may be performed in an order different from the above order. Further, the processes of the steps defining this program may be performed in parallel with those of another program or combined and performed together with those of another program.

Each of the plurality of present technologies described in the present specification can be independently carried out alone unless inconsistency arises. Needless to say, any two or more of the plurality of present technologies can be used in combination. For example, some or all of the present technologies described in any one of the embodiments can be combined and performed together with some or all of the present technologies described in other embodiments. Also, some or all of the arbitrary present technologies described above can be carried out in combination with other technologies not described above.

The present technologies can also have the following configurations.

(1) A communication apparatus including:
a communication section adapted to transmit information regarding a configuration of a retransmission signal for retransmitting information of an original signal whose demodulation has failed to a sender of the retransmission signal and receive the retransmission signal transmitted from the sender on the basis of the information regarding the configuration of the retransmission signal transmitted.

(2) The communication apparatus of feature (1), in which
the information regarding the configuration of the retransmission signal includes information regarding data whose retransmission is requested.

(3) The communication apparatus of feature (2), in which
the information regarding data whose retransmission is requested includes information regarding an identifier of the data and information regarding a length of the data.

(4) The communication apparatus of feature (3), in which
the information regarding the identifier of the data includes a sequence number of an MPDU (MAC Protocol Data Unit) in a MAC (Media Access Control) layer.

(5) The communication apparatus of feature (3) or (4), in which
the information regarding the length of the data includes a byte length of the MPDU (MAC Protocol Data Unit).

(6) The communication apparatus of any one of features (3) to (5), in which
the information regarding the length of the data includes a block count or a byte length of a coding block including, without excess or deficiency, the MPDU (MAC Protocol Data Unit).

(7) The communication apparatus of any one of features (3) to (6), in which
the information regarding the length of the data includes time of a signal at an intermediate stage of processing until conversion of the data into bit strings.

(8) The communication apparatus of any one of features (3) to (7), in which
the information regarding the data whose retransmission is requested further includes information regarding an order of the data.

(9) The communication apparatus of feature (8), in which
the information regarding the order of the data includes information regarding a connection order of the data.

(10) The communication apparatus of feature (8) or (9), in which
the information regarding the order of the data includes information regarding a rule indicating an order of the data and new data.

(11) The communication apparatus of any one of features (2) to (10), in which
the information regarding the configuration of the retransmission signal further includes information regarding a setting of information synthesis using the original signal and the retransmission signal.

(12) The communication apparatus of feature (11), in which
the information regarding the synthesis setting includes a notice to the effect that the synthesis will be performed.

(13) The communication apparatus of feature (11) or (12), in which
the information regarding the synthesis setting includes an identifier of a stream to be subjected to the synthesis.

(14) The communication apparatus of any one of features (11) to (13), in which
the information regarding the synthesis setting includes information regarding a scheme of the synthesis.

(15) The communication apparatus of any one of features (1) to (14), in which
the communication section transmits the information regarding the configuration of the retransmission signal as part of a transmission request frame of the retransmission signal.

(16) The communication apparatus of feature (15), in which
the transmission request frame is a Trigger frame.

(17) The communication apparatus of feature (15), in which
the transmission request frame is a Poll frame.

(18) The communication apparatus of any one of features (1) to (17), in which
the communication section exchanges capability information regarding information synthesis using the original signal and the retransmission signal with the sender of the retransmission signal.

(19) The communication apparatus of any one of features (1) to (18), in which
the communication section negotiates an MPDU (MAC Protocol Data Unit) unit size in a MAC (Media Access Control) layer with the sender of the retransmission signal.

(20) The communication apparatus of any one of features (1) to (19), in which
the MPDU unit size in the MAC layer is an integer multiple of a unit coding block in a physical layer.

(21) The communication apparatus of any one of features (1) to (20), further including:
a synthesis section adapted to synthesize information by using the original signal and the retransmission signal received by the communication section.

(22) The communication apparatus of feature (21), in which
the synthesis section performs the synthesis on the basis of the information regarding the configuration of the retransmission signal.

(23) The communication apparatus of feature (22), further including:
a retention section adapted to retain the original signal whose demodulation has failed, in which
the synthesis section performs the synthesis by using the original signal read out from the retention section and the retransmission signal received by the communication section on the basis of the information regarding the configuration of the retransmission signal.

(24) The communication apparatus of feature (23), in which the retention section retains bit strings acquired by demodulating the original signal, and the synthesis section performs the synthesis by using the bit strings read out from the retention section and bit strings acquired by demodulating the retransmission signal received by the communication section on the basis of the information regarding the configuration of the retransmission signal.

(25) The communication apparatus of feature (23) or (24), in which the retention section retains the original signal, and the synthesis section performs the synthesis by using the original signal read out from the retention section and the retransmission signal received by the communication section, on the basis of the information regarding the configuration of the retransmission signal, at an intermediate stage of processing until conversion of the signal received by the communication section into data.

(26) A communication method including:

by a communication apparatus transmitting information regarding a configuration of a retransmission signal for retransmitting information of an original signal whose demodulation has failed to a sender of the retransmission signal; and receiving the retransmission signal transmitted from the sender on the basis of the information regarding the configuration of the retransmission signal transmitted.

(31) A communication apparatus including:

a communication section adapted to receive information regarding a configuration of a retransmission signal for retransmitting information of an original signal whose demodulation has failed, generate the retransmission signal on the basis of the information regarding the configuration of the retransmission signal received, and transmit the generated retransmission signal to a sender of the information regarding the configuration of the retransmission signal.

(32) The communication apparatus of feature (31), in which the information regarding the configuration of the retransmission signal includes information regarding data whose retransmission is requested.

(33) The communication apparatus of feature (32), in which the information regarding the data whose retransmission is requested includes information regarding an identifier of the data and information regarding a length of the data.

(34) The communication apparatus of feature (33), in which the information regarding the identifier of the data includes a sequence number of an MPDU (MAC Protocol Data Unit) in a MAC (Media Access Control) layer.

(35) The communication apparatus of feature (33) or (34), in which the information regarding the length of the data includes a byte length of the MPDU (MAC Protocol Data Unit).

(36) The communication apparatus of any one of features (33) to (35), in which the information regarding the length of the data includes a block count or a byte length of a coding block including, without excess or deficiency, the MPDU (MAC Protocol Data Unit).

(37) The communication apparatus of any one of features (33) to (36), in which the information regarding the length of the data includes time of a signal at an intermediate stage of processing until conversion of the data into bit strings.

(38) The communication apparatus of any one of features (33) to (37), in which the information regarding the data whose retransmission is requested further includes information regarding an order of the data.

(39) The communication apparatus of feature (38), in which the information regarding the order of the data includes information regarding a connection order of the data.

(40) The communication apparatus of feature (38) or (39), in which the information regarding the order of the data includes information regarding a rule indicating an order of the data and new data.

(41) The communication apparatus of any one of features (32) to (40), in which the information regarding the configuration of the retransmission signal further includes information regarding a setting of information synthesis using the original signal and the retransmission signal.

(42) The communication apparatus of feature (41), in which the information regarding the synthesis setting includes a notice to the effect that the synthesis will be performed.

(43) The communication apparatus of feature (41) or (42), in which the information regarding the synthesis setting includes an identifier of a stream to be subjected to the synthesis.

(44) The communication apparatus of any one of features (41) to (43), in which the information regarding the synthesis setting includes information regarding a scheme of the synthesis.

(45) The communication apparatus of any one of features (31) to (44), in which the communication section receives the information regarding the configuration of the retransmission signal as part of a transmission request frame of the retransmission signal.

(46) The communication apparatus of feature (45), in which the transmission request frame is a Trigger frame.

(47) The communication apparatus of feature (45), in which the transmission request frame is a Poll frame.

(48) The communication apparatus of any one of features (31) to (47), in which the communication section exchanges capability information regarding information synthesis using the original signal and the retransmission signal with the sender of the information regarding the configuration of the retransmission signal.

(49) The communication apparatus of any one of features (31) to (48), in which the communication section negotiates an MPDU (MAC Protocol Data Unit) unit size in a MAC (Media Access Control) layer with the sender of the information regarding the configuration of the retransmission signal.

(50) The communication apparatus of any one of features (31) to (49), in which the MPDU unit size in the MAC layer is an integer multiple of a unit coding block in the physical layer.

(51) The communication apparatus of any one of features (31) to (50), in which in a case where retransmission of data that has already been discarded is requested, the communication section notifies a requester that the data has already been discarded.

(52) The communication apparatus of feature (51), in which
the communication section notifies the requester that the data has already been discarded by transmitting Null data to the requester.

(53) A communication method including:
by a communication apparatus
receiving information regarding a configuration of a retransmission signal for retransmitting information of an original signal whose demodulation has failed;
generating the retransmission signal on the basis of the information regarding the configuration of the retransmission signal received; and
transmitting the generated retransmission signal to a sender of the information regarding the configuration of the retransmission signal.

REFERENCE SIGNS LIST

100 Communication system, 101 Base station, 102 Terminal apparatus, 200 Communication apparatus, 201 Control section, 202 Data processing section, 203 Wireless communication section, 211 Modulation/demodulation section, 212 Signal processing section, 213 Channel estimation section, 214 Wireless interface section, 215 Amplifier section, 216 Antenna, 221 Power supply section, 231 Demodulation section, 232 Signal retention section, 233 Signal synthesis section, 900 Computer

The invention claimed is:

1. A communication apparatus, comprising:
circuit configured to:
transmit first information to a sender of a retransmission signal,
wherein
the first information is regarding a configuration of the retransmission signal, and
the retransmission signal includes second information of an original signal whose demodulation has failed; and
receive the retransmission signal transmitted from the sender, wherein
the first information includes:
a first identifier of a first piece of a plurality of pieces of retransmission data of the second information, and
a second identifier of a second piece, succeeding the first piece, of the plurality of pieces of the retransmission data, and
the second identifier is in a bitmap format relative to the first identifier as a reference.

2. The communication apparatus of claim 1, wherein the first information further includes third information regarding an identifier of an MPDU (MAC Protocol Data Unit) and fourth information regarding a length of the MPDU.

3. The communication apparatus of claim 1, wherein
the first information further includes information regarding a setting, and
a signal is synthesized using the original signal and the retransmission signal, based on the setting.

4. The communication apparatus of claim 1, wherein the circuit is further configured to transmit the first information as part of a transmission request frame for the retransmission signal.

5. The communication apparatus of claim 1, wherein
the circuit is further configured to exchange capability information with the sender of the retransmission signal, and
a signal is synthesized using the second information of the original signal and third information of the retransmission signal, based on the capability information.

6. The communication apparatus of claim 1, wherein the circuit is further configured to negotiate an MPDU (MAC Protocol Data Unit) unit size in a MAC (Media Access Control) layer with the sender of the retransmission signal.

7. The communication apparatus of claim 1, wherein the circuit is further configured to:
retain bit strings acquired by demodulation of the original signal; and
synthesis a signal using the original signal and the retransmission signal, by using the retained bit strings and bit strings acquired by demodulation of the retransmission signal received based on the first information.

8. The communication apparatus of claim 1, wherein the circuit is further configured to:
retain the original signal; and
perform information synthesis using the retained original signal and the retransmission signal received based on the first information signal at an intermediate stage of processing until conversion of a signal received by the circuit into data.

9. A communication method, comprising:
by a communication apparatus:
transmitting first information to a sender of a retransmission signal,
wherein
the first information is regarding a configuration of the retransmission signal, and
the retransmission signal includes second information of an original signal whose demodulation has failed; and
receiving the retransmission signal transmitted from the sender, wherein
the first information includes:
a first identifier of a first piece of a plurality of pieces of retransmission data of the second information, and
a second identifier of a second piece, succeeding the first piece, of the plurality of pieces of the retransmission data, and
the second identifier is in a bitmap format relative to the first identifier as a reference.

10. A communication apparatus, comprising:
a circuit configured to:
receive first information regarding a configuration of a retransmission signal, wherein
the retransmission signal includes second information of an original signal whose demodulation has failed,
generate the retransmission signal; and
transmit the generated retransmission signal to a sender of the first information regarding the configuration of the retransmission signal,
wherein
the first information includes:
a first identifier of a first piece of a plurality of pieces of retransmission data of the second information, and
a second identifier of a second piece, succeeding the first piece, of the plurality of pieces of the retransmission data, and
the second identifier is in a bitmap format relative to the first identifier as a reference.

11. The communication apparatus of claim 10, wherein the first information further includes third information regarding an identifier of an MPDU (MAC Protocol Data Unit) and fourth information regarding a length of the MPDU.

12. The communication apparatus of claim 10, wherein the first information further includes information regarding a setting of information synthesis using the original signal and the retransmission signal.

13. The communication apparatus of claim 10, wherein the circuit is further configured to receive the first information regarding the configuration of the retransmission signal as part of a transmission request frame of the retransmission signal.

14. The communication apparatus of claim 10, wherein
the circuit is further configured to exchange capability information with the sender of the first information, and
the capability information is regarding information synthesis using the second information of the original signal and third information of the retransmission signal.

15. The communication apparatus of claim 10, wherein the circuit is further configured to negotiate an MPDU (MAC Protocol Data Unit) unit size in a MAC (Media Access Control) layer with the sender of the first information regarding the configuration of the retransmission signal.

16. The communication apparatus of claim 10, wherein in a case where retransmission of data that has already been discarded is requested, the circuit is further configured to notify a requester that the data has already been discarded.

17. The communication apparatus of claim 16, wherein the circuit is further configured to notify the requester that the retransmission data has already been discarded based on transmission of specific data to the requester.

18. A communication method, comprising:
by a communication apparatus:
receiving first information regarding a configuration of a retransmission signal, wherein
the retransmission signal includes second information of an original signal whose demodulation has failed;
generating the retransmission signal; and
transmitting the generated retransmission signal to a sender of the first information regarding the configuration of the retransmission signal,
wherein
the first information includes:
a first identifier of a first piece of a plurality of pieces of retransmission data of the second information, and
a second identifier of a second piece, succeeding the first piece, of the plurality of pieces of the retransmission data, and
the second identifier is in a bitmap format relative to the first identifier as a reference.

* * * * *